United States Patent
Shimoyama et al.

(10) Patent No.: US 10,625,715 B2
(45) Date of Patent: Apr. 21, 2020

(54) WIPER BLADE

(71) Applicants: Mitsuba Corporation, Gunma (JP); Honda Motor Co., Ltd., Tokyo (JP)

(72) Inventors: Masayuki Shimoyama, Gunma (JP); Masayuki Arima, Gunma (JP); Masaya Yonaga, Gunma (JP); Takeshi Sasaki, Saitama (JP); Tatsuya Ohmaru, Saitama (JP); Taisuke Goto, Saitama (JP)

(73) Assignees: Mitsuba Corporation, Kiryu-shi, Gunma (JP); Honda Motor Co., Ltd., Tokyo (JP)

( * ) Notice: Subject to any disclaimer, the term of this patent is extended or adjusted under 35 U.S.C. 154(b) by 415 days.

(21) Appl. No.: 15/113,458

(22) PCT Filed: Dec. 18, 2014

(86) PCT No.: PCT/JP2014/083621
§ 371 (c)(1),
(2) Date: Jul. 22, 2016

(87) PCT Pub. No.: WO2015/114988
PCT Pub. Date: Aug. 6, 2015

(65) Prior Publication Data
US 2017/0008495 A1    Jan. 12, 2017

(30) Foreign Application Priority Data

Jan. 30, 2014 (JP) ................... 2014-015321
Jan. 30, 2014 (JP) ................... 2014-015322
Jan. 30, 2014 (JP) ................... 2014-015323

(51) Int. Cl.
*B60S 1/52* (2006.01)
*B60S 1/38* (2006.01)
*B60S 1/40* (2006.01)

(52) U.S. Cl.
CPC ............. *B60S 1/524* (2013.01); *B60S 1/3856* (2013.01); *B60S 1/3862* (2013.01);
(Continued)

(58) Field of Classification Search
CPC .............................. B60S 1/3862; B60S 1/522
(Continued)

(56) References Cited

U.S. PATENT DOCUMENTS

2008/0216274 A1* 9/2008 Egner-Walter .......... B60S 1/524
15/250.02
2010/0186185 A1* 7/2010 Grasso .................... B60S 1/387
15/250.32

(Continued)

FOREIGN PATENT DOCUMENTS

CN    101362457 A    2/2009
CN    101868384 A    10/2010
(Continued)

OTHER PUBLICATIONS

FR2929907A1 (machine translation) (Year: 2009).*
(Continued)

*Primary Examiner* — Andrew A Horton
(74) *Attorney, Agent, or Firm* — McCormick, Paulding & Huber PLLC

(57) ABSTRACT injection positions (A2, B2, and C2) toward which washer liquids (W) are injected from the forward-side injection nozzles (A1, B1, and C1) and injection positions (D2 and E2) which washer liquids (W) are injected from the backward-side injection nozzles (D1 and E1) are alternatively shifted in the longitudinal direction of the blade rubber. Therefore, in wiping-out motion of the blade rubber for one reciprocation, the front glass (12) can uniformly get wet, the total number of injection nozzles can be made less than ever, the consumption amount of washer liquid (W) at the time of
(Continued)

[Injection Position of Washer Liquid "W"]

reciprocating wiping-out motion of the blade rubber can be reduced, power consumption of the washer pump can be reduced, and the size of the washer pump can be decreased.

4 Claims, 27 Drawing Sheets

(52) U.S. Cl.
CPC ........... B60S 1/3881 (2013.01); B60S 1/3886 (2013.01); B60S 1/4006 (2013.01)

(58) Field of Classification Search
USPC ...................................................... 15/250.04
See application file for complete search history.

(56) References Cited

U.S. PATENT DOCUMENTS

| | | | |
|---|---|---|---|
| 2013/0152320 A1 | 6/2013 | Matsumoto | |
| 2015/0175135 A1 | 6/2015 | Caillot et al. | |

FOREIGN PATENT DOCUMENTS

| | | | | |
|---|---|---|---|---|
| CN | 103079911 A | 5/2013 | | |
| DE | 28 39 298 A1 | 3/1980 | | |
| DE | 9200762 U1 | 4/1992 | | |
| FR | 2929907 A1 | * | 10/2009 | .............. B60S 1/524 |
| GB | 1 493 597 A | 11/1977 | | |
| JP | H06-500061 A | 1/1994 | | |
| JP | 2009-040086 A | 2/2009 | | |
| JP | 2011-502876 A | 1/2011 | | |
| JP | 2012-224231 A | 11/2012 | | |
| JP | 2013079029 A | 5/2013 | | |

OTHER PUBLICATIONS

International Search Report for International Application No. PCT/JP2014/083621 dated Mar. 5, 2015.
Supplementary Partial European Search Report for Serial No. EP 14 88 0724 dated Aug. 28, 2017.

* cited by examiner

[Forward-side Wiping-out Operation]

[Backward-side Wiping-out Operation]

[Injection Position of Washer Liquid "W"]

WIPER BLADE

CROSS REFERENCE TO RELATED APPLICATION

Applicant hereby claims foreign priority benefits under U.S.C. § 119 from International Patent Application Serial No. PCT/JP2014/083621 filed on Dec. 18, 2014; Japanese Patent Application No. 2014-015321 filed on Jan. 30, 2014; Japanese Patent Application No. 2014-015322 filed Jan. 30, 2014; and Japanese Patent Application No. 2014-015323 filed on Jan. 30, 2014; the contents of all of which are incorporated by reference herein.

TECHNICAL FIELD

The present invention relates to a wiper blade attached to a wiper arm provided to a vehicle to make a reciprocating wiping-out motion on a windshield.

BACKGROUND ART

A wiper apparatus for ensuring a field of view from a driver and the like through a windshield is mounted on a vehicle such as automotive vehicle. The wiper apparatus includes: a wiper arm driven and swung by an electric motor; and a wiper blade attached to the wiper arm. The wiper blade includes: a holder member attached to a tip portion of the wiper arm; and a blade rubber held by the holder member. When a wiper switch provided inside the vehicle is turned ON, the wiper arm is driven and swung, thereby causing the blade rubber to make reciprocating motion on a windshield, and to wipe off rain water and the like on the windshield.

For example, when extraneous matters such as dust are on the windshield, the wiper blade is caused to make the reciprocating wiping-out motion while washer liquid is injected to the windshield. With this construction, extraneous matters such as dust can get moist and the front surface of the windshield can be cleanly wiped without being damaged. Normally, the washer liquid is injected from a nozzle installed to a hood (bonnet) of the vehicle or the like on the windshield. In this case, there are disadvantages as follows. That is, the injection position of the washer liquid may intercept a field of view from a driver and the like through a windshield. Since the distance between the nozzle and the windshield is relatively long, the injection position of the washer liquid may be deviated by traveling wind or the like. Since a relatively large amount of washer liquid is used in a flow passage, a washer tank may be frequently refilled with washer liquid.

In order to solve the above-described disadvantages, for example, a wiper blade described in Re-publication of PCT International Publication No. JP2011-502876 has been developed. The wiper blade described in Re-publication of PCT International Publication No. JP2011-502876 includes a flow passage (long passage) through which washer liquid passes, and which extends in a longitudinal direction of the wiper blade. The washer liquid is injected from apertures formed in the flow passage toward the windshield, thereby wetting an area close to the blade rubber. Note that washer liquid flowing through the flow passage is supplied from a center coupling portion attached to the wiper blade.

SUMMARY

However, according to the wiper blade described in the above patent document, the flow passage including the plurality of apertures is provided similarly to each of a forward side and a backward side of the wiper blade over the entire region in the longitudinal direction of the wiper blade. Therefore, on the forward side and the backward side of the wiper blade, approximately the same amount of washer liquid is injected, and therefore the amount of the washer liquid yet tends to be excessive. Thus, due to a large amount of injected washer liquid, it is difficult to apply a small-sized washer pump with reduced power consumption.

An object of the present invention is to provide a wiper blade capable of uniformly wetting a windshield while decreasing the amount of washer liquid to be injected to reduce power consumption.

According to one aspect of the present invention, there is provided a wiper blade attached to a wiper arm provided to a vehicle to make reciprocating wiping-out motion over a windshield, the wiper blade comprising: a blade rubber provided to the wiper blade and in contact with the windshield; and a washer apparatus provided to a coupling unit between the wiper arm and the wiper blade to inject washer liquid, wherein the washer apparatus has a plurality of forward-side injection nozzles oriented to a forward side of the blade rubber and a plurality of backward-side injection nozzles oriented to a backward side of the blade rubber, injection positions toward which washer liquids are injected from the forward-side injection nozzles and injection positions toward which washer liquids are injected from the backward-side injection nozzles are shifted in a longitudinal direction of the blade rubber and alternatively arranged in the longitudinal direction of the blade rubber, the injection positions toward which washer liquids are injected from the forward-side injection nozzles are close to one end of the blade rubber in the longitudinal direction and close to the other end of the blade rubber in the longitudinal direction as compared with the injection positions toward which washer liquids are injected from the backward-side injection nozzles.

In another aspect of the present invention, among the forward-side injection nozzles and the backward-side injection nozzles, nozzles disposed on both sides in the longitudinal direction of the blade rubber are respectively oriented to one side and another side in the longitudinal direction of the blade rubber.

In another aspect of the present invention, the number of forward-side injection nozzles is larger than the number of backward-side injection nozzles.

In another aspect of the present invention, a forward-side injection nozzle closest to one side in the longitudinal direction of the blade rubber among the forward-side injection nozzles is disposed closer to said one side in the longitudinal direction of the blade rubber as compared with a backward-side injection nozzle closest to said one side in the longitudinal direction of the blade rubber among the backward-side injection nozzles, and a forward-side injection nozzle closest to another side in the longitudinal direction of the blade rubber among the forward-side injection nozzles is disposed closer to the other side in the longitudinal direction of the blade rubber than a backward-side injection nozzle closest to the other side in the longitudinal direction of the blade rubber among the backward-side injection nozzles.

According to another aspect of the present invention, there is provided a wiper blade attached to a wiper arm provided to a vehicle to make reciprocating wiping-out motion over a windshield, the wiper blade comprising: a blade rubber in contact with the windshield; a holder member which holds the blade rubber and has elasticity; a vertebra provided inside the holder member, and adapted to bring the blade rubber into intimate contact with the windshield, a coupling member fixed to the vertebra, the coupling member having stiffness higher than stiffness of the holder member and coupled to the wiper arm; an attachment hole opening in a direction crossing a longitudinal direction of the blade rubber; and a washer apparatus having a fixing claw to be inserted and fixed to the attachment hole, the washer apparatus to be fixed to the coupling member.

In another aspect of the present invention, the fixing claw includes: a positioning claw for positioning the washer apparatus with respect to the coupling member; and a retaining claw for preventing the washer apparatus from coming off from the coupling member.

In another aspect of the present invention, a cover member is provided between the coupling member and the washer apparatus so as to cover the coupling member.

In another aspect of the present invention, the washer apparatus is provided in a range of a projected area of the cover member in a planar view from a direction crossing the longitudinal direction of the blade rubber.

According to another aspect of the present invention, there is provided a wiper blade attached to a wiper arm provided to a vehicle to make reciprocating wiping-out motion over a windshield, the wiper blade comprising: a blade rubber including a contact unit in contact with the windshield; a holder member which holds the blade rubber; a vertebra provided inside the holder member, and adapted to bring the blade rubber into intimate contact with the windshield; a coupling member provided to the vertebra, and coupled to the wiper arm; and a washer apparatus fixed to the coupling member, and shorter in length than the holder member in the longitudinal direction the holder member, wherein the washer apparatus is at a position away from the windshield from a boundary part between the holder member and the blade rubber in a plane perpendicular to a longitudinal direction of the blade rubber.

In another aspect of the present invention, 11, in the plane perpendicular to the longitudinal direction of the blade rubber, the washer apparatus is disposed outside a region between a first reference line passing through the contact unit and in parallel with a front surface of the windshield and a second reference line passing through the contact unit and in contact with the holder member.

In another aspect of the present invention, a cover member is provided to the coupling unit so as to cover the coupling unit, and the washer apparatus is provided in a range of a projected area of the cover member in a planar view from a direction crossing the longitudinal direction of the blade rubber.

In another aspect of the present invention, the washer apparatus has a lower surface provided on the same side as the blade rubber, the lower surface extending substantially parallel with the windshield and having: an injection nozzle which injects washer liquid; and a tilted surface tilted upward from the lower surface as heading toward a side away from the blade rubber.

According to the present invention, since the injection position of the washer liquid injected from the forward-side injection nozzle and the injection position of the washer liquid injected from the backward-side injection nozzle are shifted in the longitudinal direction of the blade rubber, the injection positions on the windshield are made different between the forward side and the backward side of the blade rubber and, in turn, the windshield can uniformly get wet in wiping-out motion of the blade rubber for one reciprocation. Therefore, the total number of injection nozzles can be made less than ever and, in turn, the consumption amount of the washer liquid at the time of reciprocating wiping-out motion of the blade rubber can be reduced. Thus, power consumption of the washer pump can be reduced, and the size of the washer pump can be decreased

DETAILED DESCRIPTION

Hereinafter, the first embodiment of the present invention will be described in detail with reference to the accompanying drawings.

Figure 1:
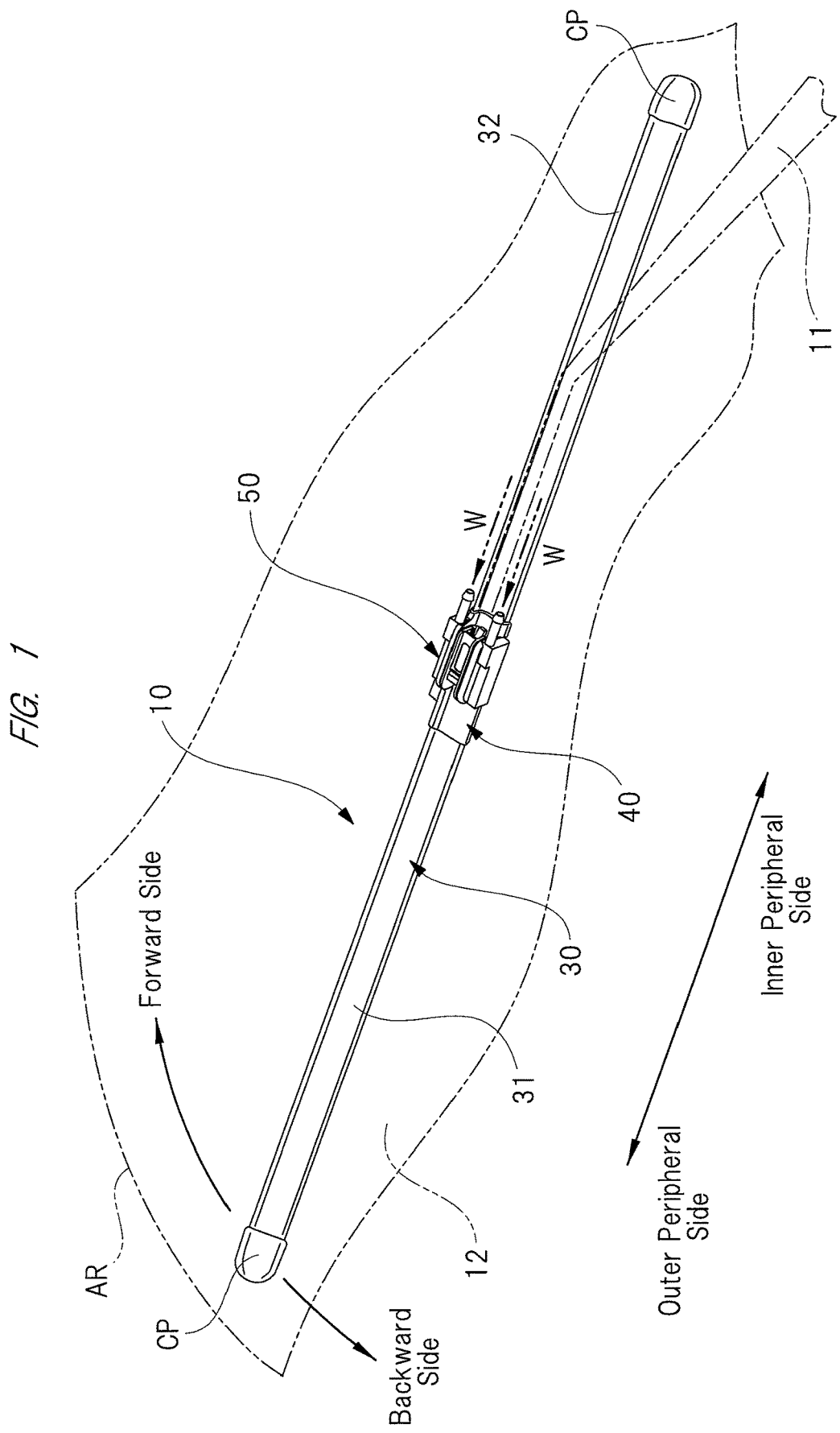
FIG. 1 is a perspective view showing an entire wiper blade of a first embodiment.
Figure 2:
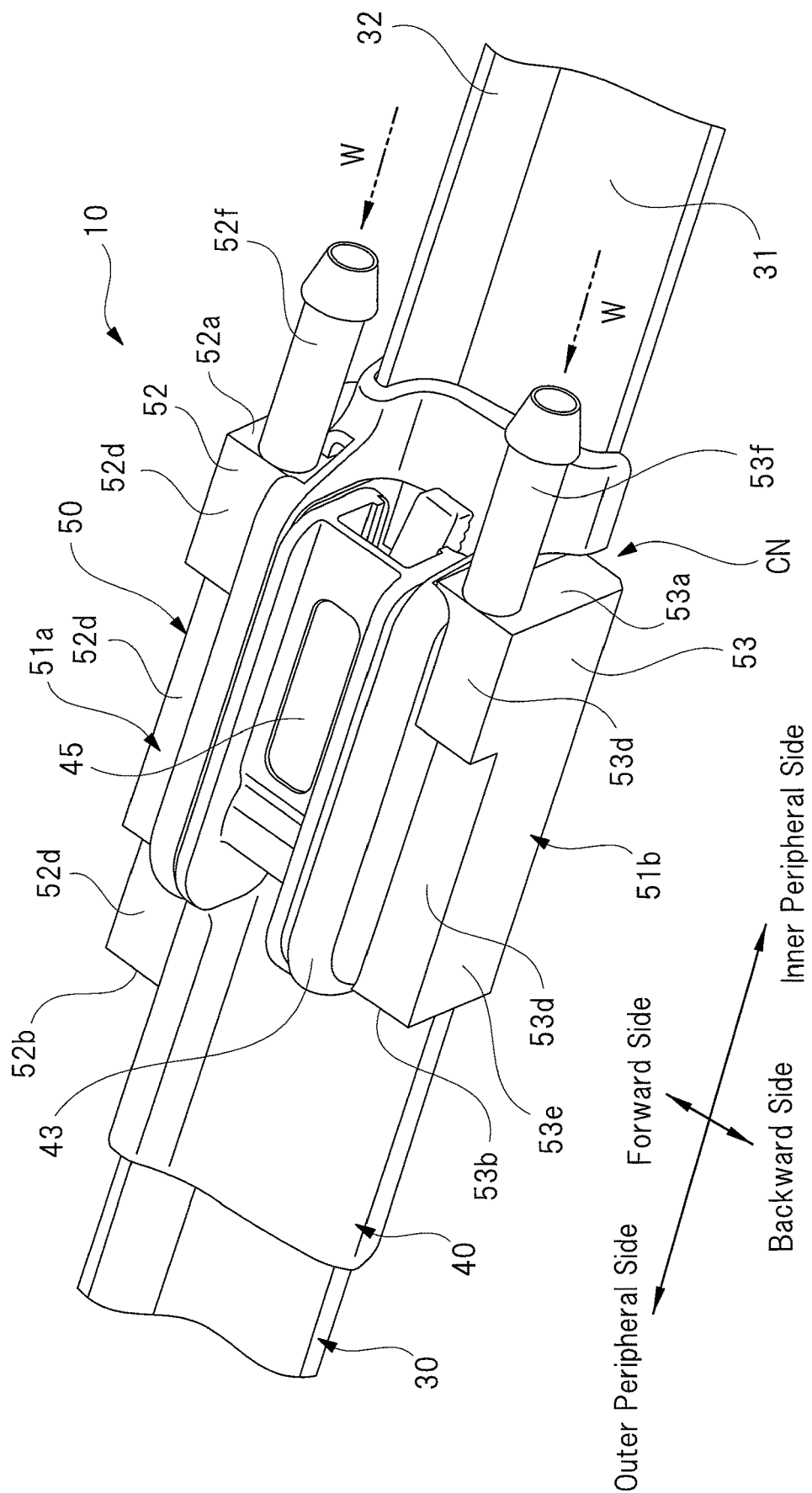
FIG. 2 is an enlarged perspective view of the periphery of a coupling member of the wiper blade of FIG. 1, viewed from a front side.
Figure 3:
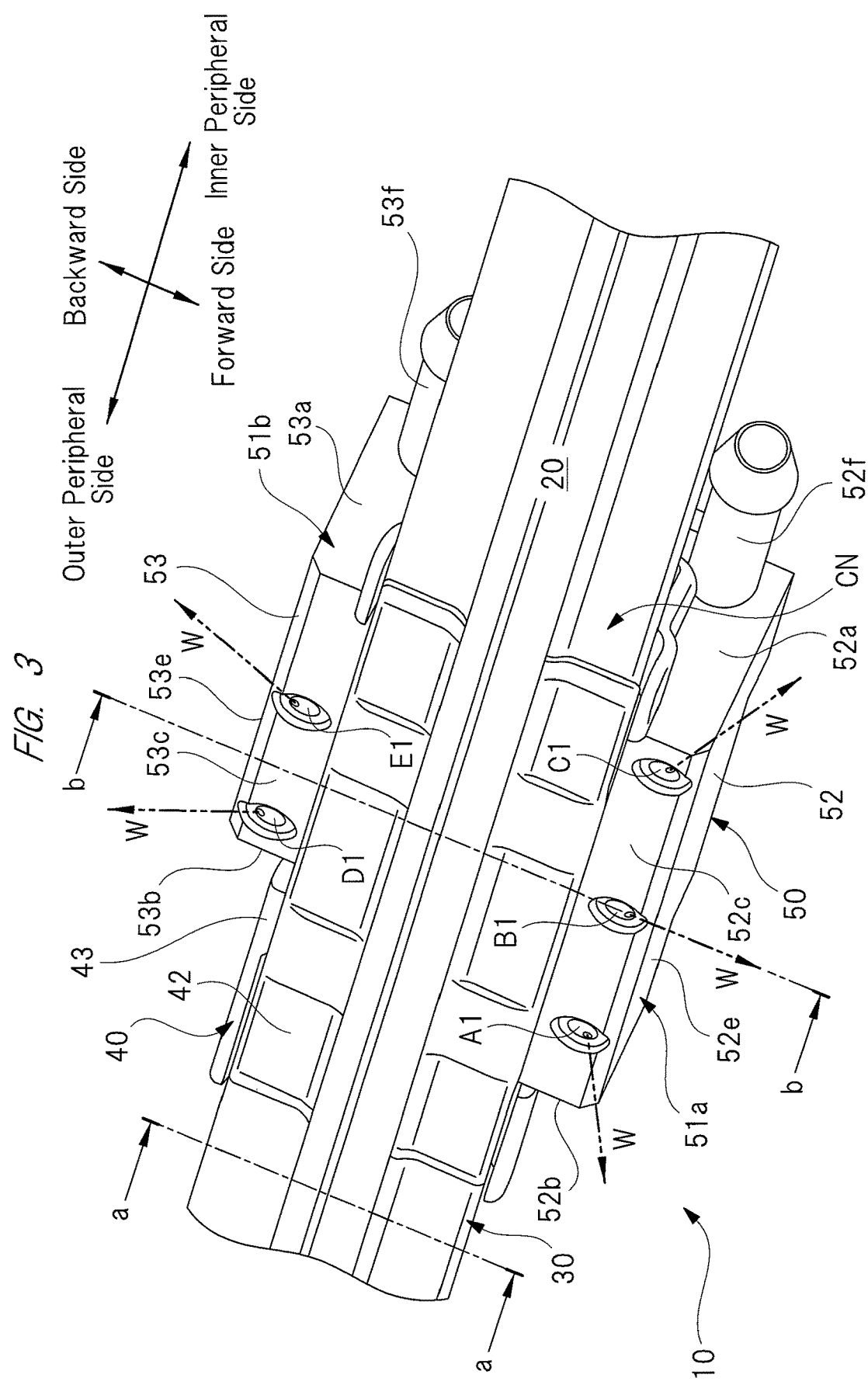
FIG. 3 is an enlarged perspective view of the periphery of the coupling member of the wiper blade of FIG. 1, viewed from a rear side.
Figure 4:
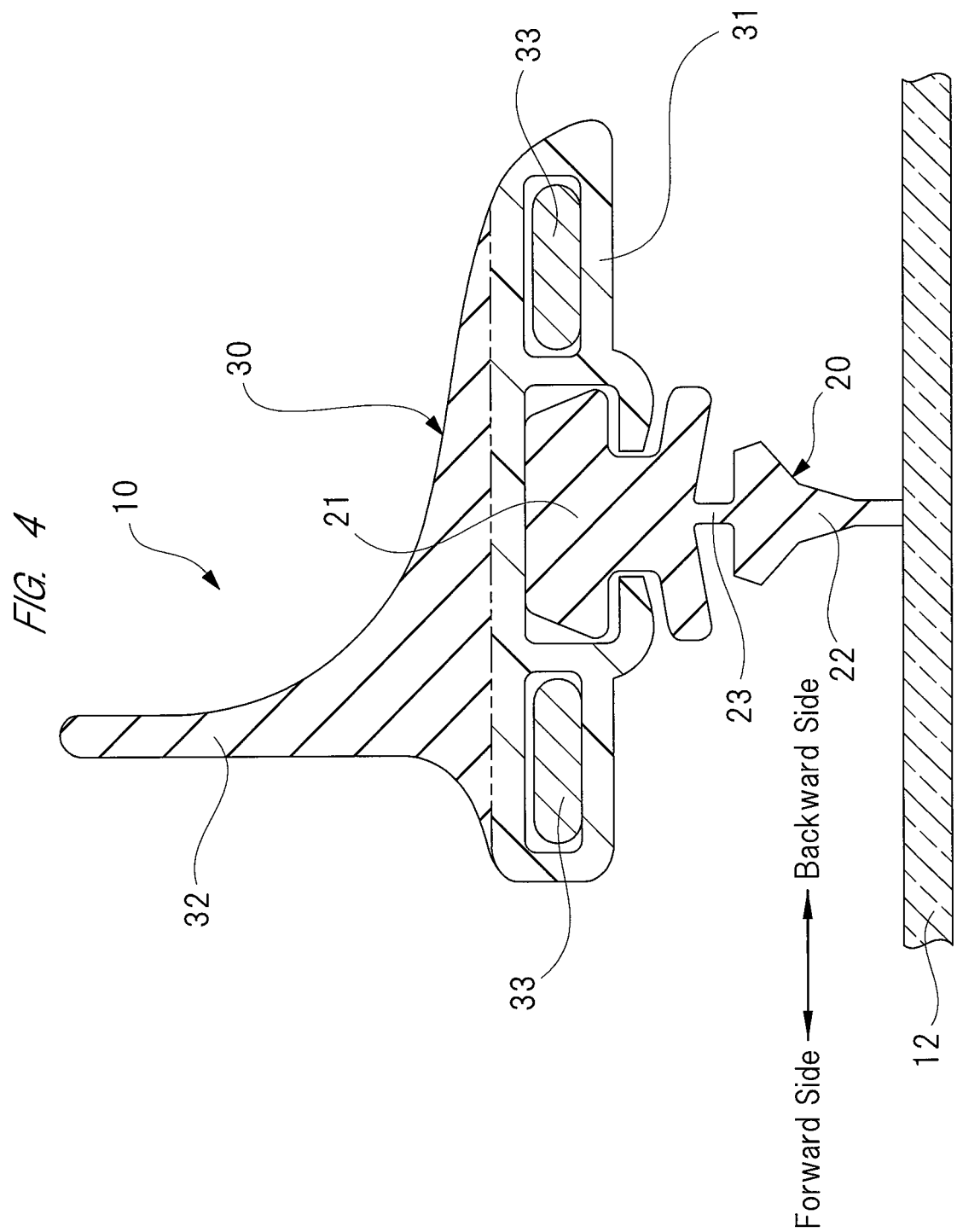
FIG. 4 is a sectional view along an a-a line of FIG. 3.
Figure 5:
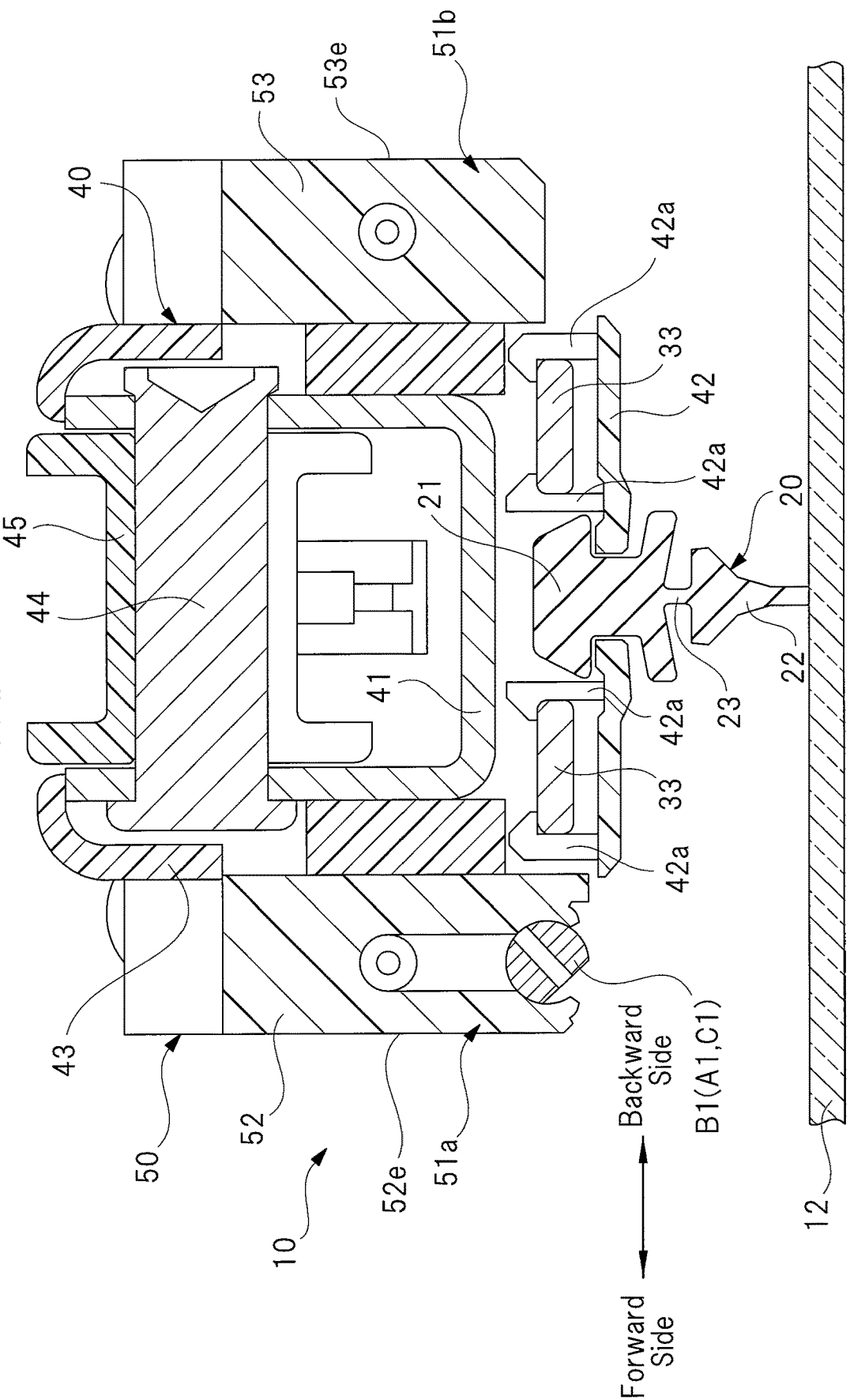
FIG. 5 is a sectional view along a b-b line of FIG. 3.
Figure 6:
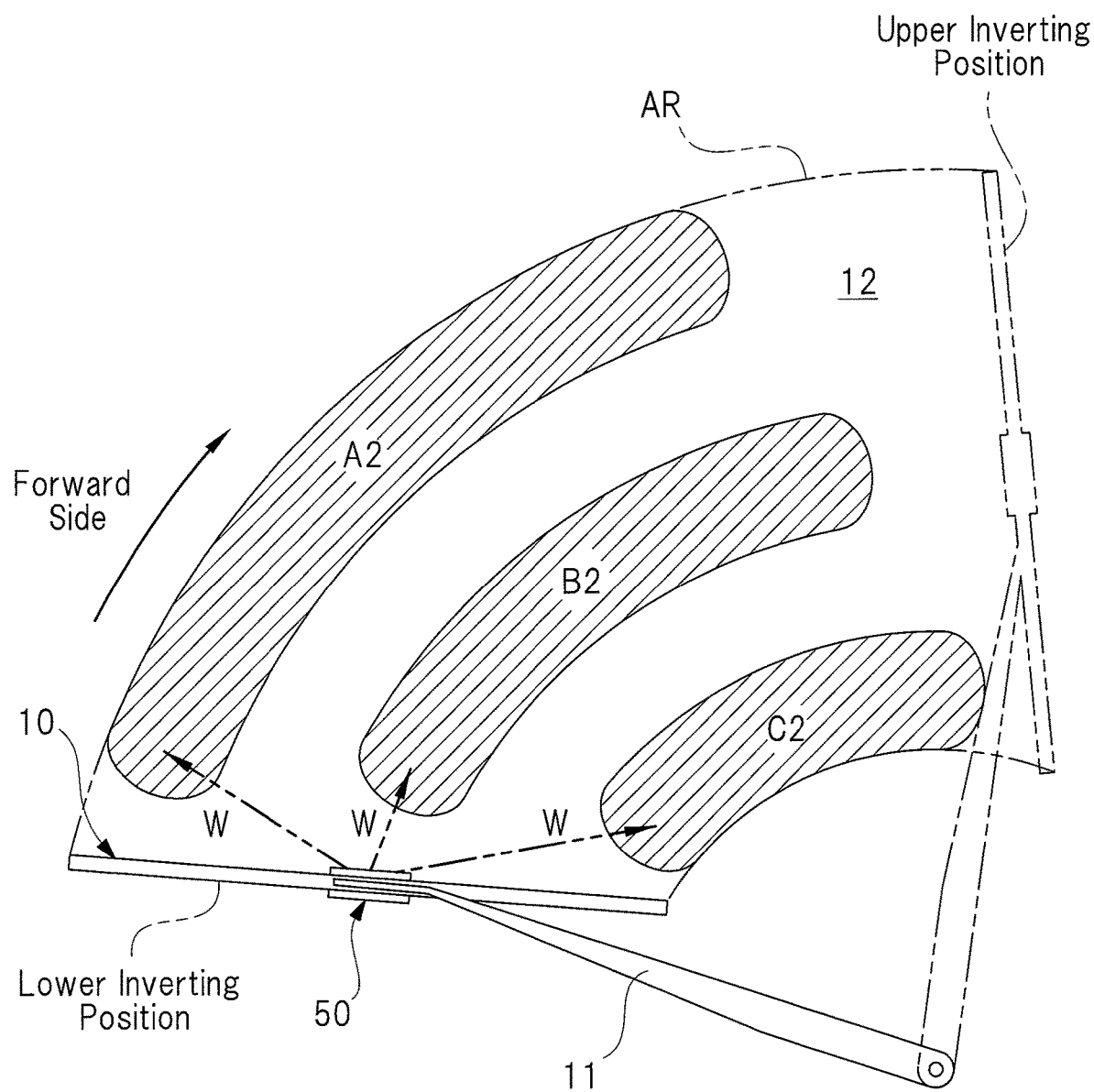
FIG. 6 is a diagram for describing injection positions (A2 to C2) of washer liquid in forward-side wiping-out motion.
Figure 7:
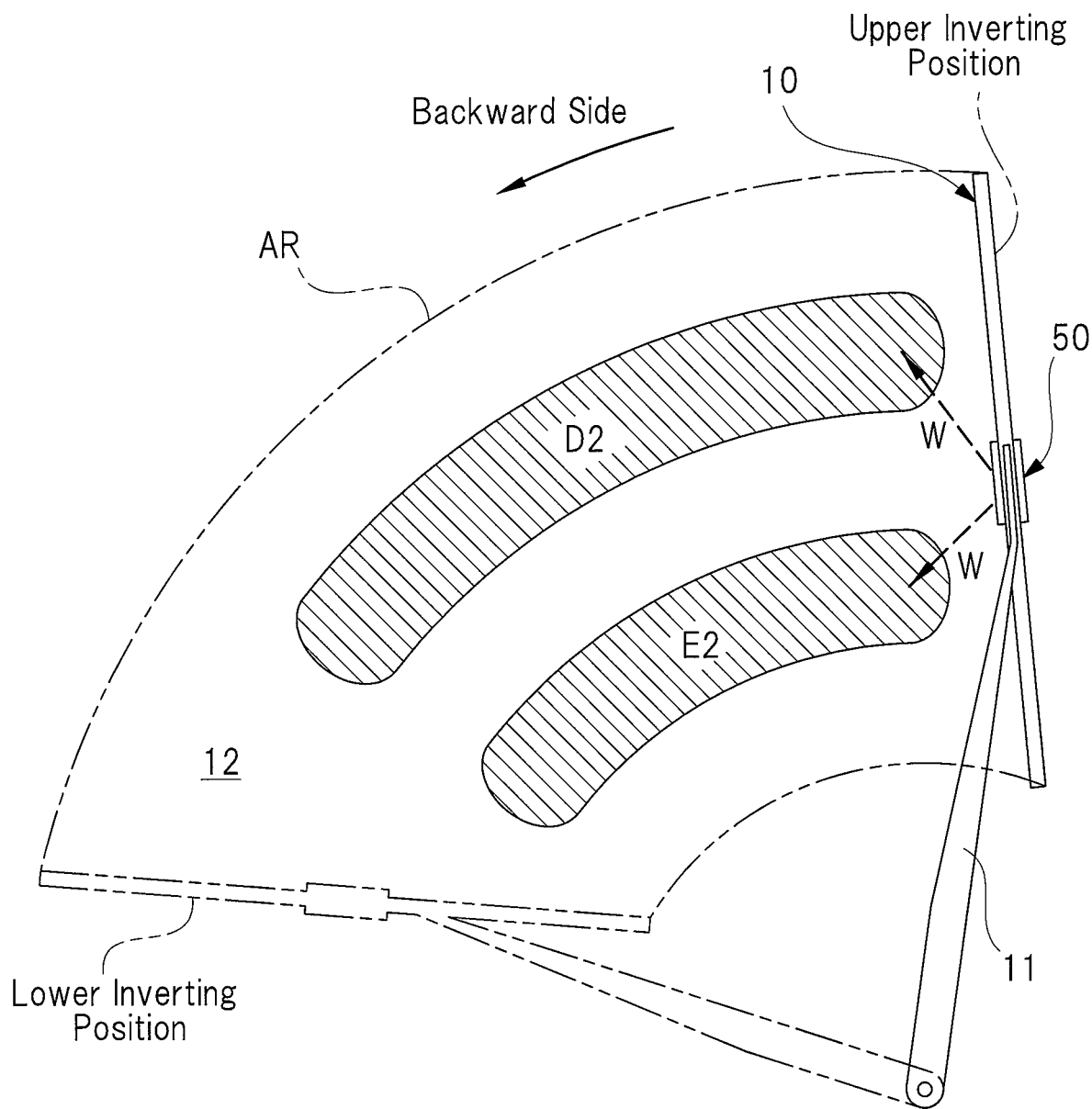
FIG. 7 is a diagram for describing injection positions (D2 and E2) of washer liquid in backward-side wiping-out motion.
Figure 8:
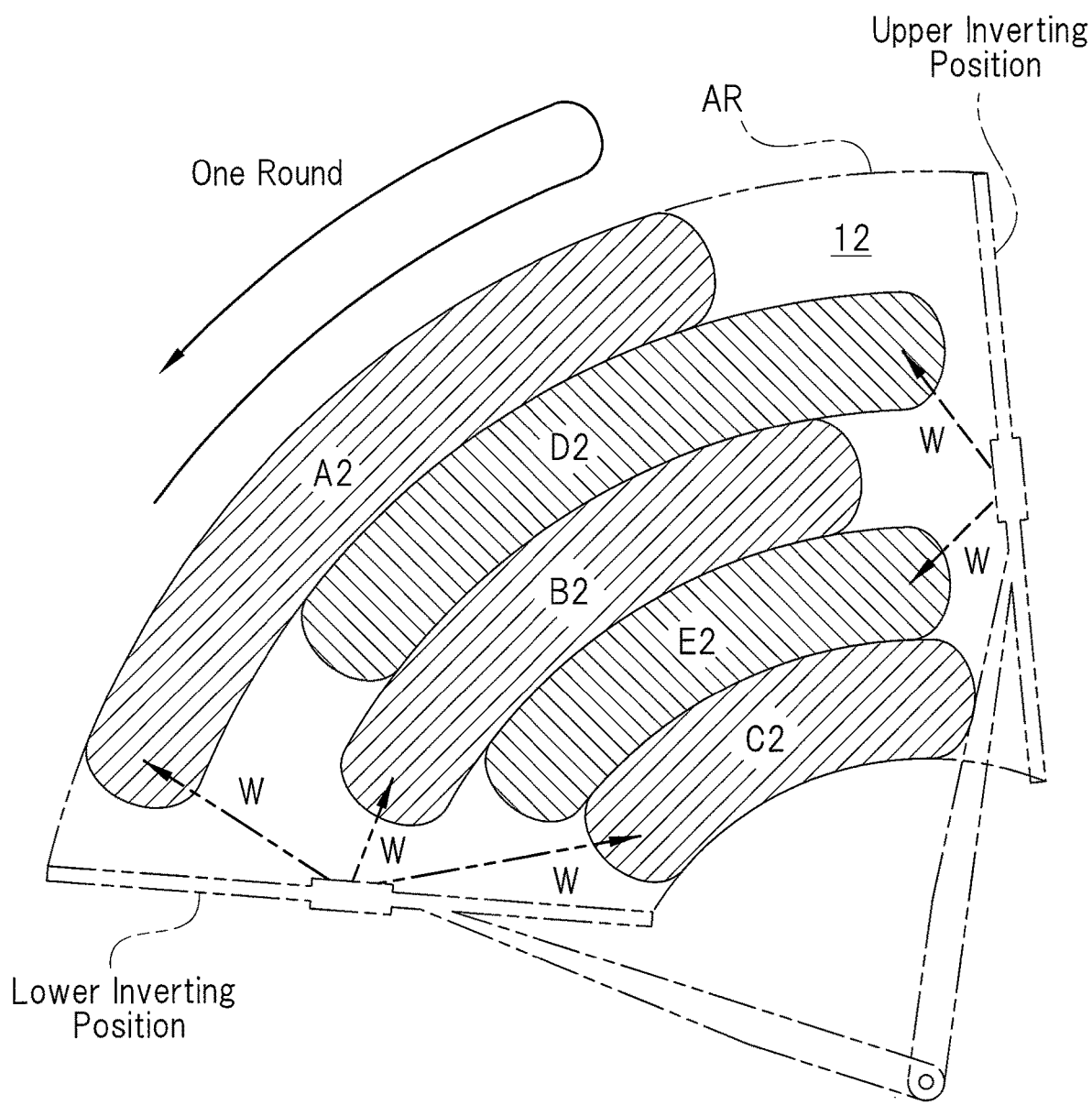
FIG. 8 is a diagram for describing injection positions (A2 to E2) of washer liquid.

FIG. 1 is a perspective view showing an entire wiper blade of a first embodiment, FIG. 2 is an enlarged perspective view of the periphery of a coupling member of the wiper blade of FIG. 1, viewed from a front side, FIG. 3 is an enlarged perspective view of the periphery of the coupling member of the wiper blade of FIG. 1, viewed from a rear side, FIG. 4 is a sectional view along an a-a line of FIG. 3, FIG. 5 is a sectional view along a b-b line of FIG. 3, FIG. 6 is a diagram for describing injection positions (A2 to C2) of washer liquid in forward-side wiping-out motion, FIG. 7 is a diagram for describing injection positions (D2 and E2) of washer liquid in backward-side wiping-out motion, and FIG. 8 is a diagram for describing injection positions (A2 to E2) of washer liquid.

As shown in FIG. 1, a wiper blade 10 is rotatably attached to a tip portion of a wiper arm 11 provided on a front side (not shown) of a vehicle such as automotive vehicle. With ON operation on a wiper switch (not shown) provided inside a cabin, the wiper arm 11 is driven for swinging with rotational driving of a wiper motor (not shown). This causes the wiper blade 10 to make reciprocating wiping-out motion in a predetermined wiping range "AR" formed on a front glass (windshield) 12 toward a forward side and a backward side as indicated by arrows in the drawing.

As shown in FIGS. 1 to 5, the wiper blade 10 includes: a blade rubber 20 in contact with the front glass 12; a holder member 30 which holds the blade rubber 20; a coupling member 40 provided to an intermediate portion of the holder member 30 in a longitudinal direction; and a washer apparatus 50 provided to the coupling member 40. Here, paired end caps "CP" are attached to both end portions of the holder member 30 in the longitudinal direction, thereby preventing the blade rubber 20 held by the holder member 30 from falling out.

As shown in FIGS. 4 and 5, the blade rubber 20 includes: a main body portion 21 held by the holder member 30; a lip portion 22 in contact with the front glass 12; and a neck portion 23 which couples the main body portion 21 and the lip portion 22 to each other. Note that the blade rubber 20 is formed so as to be long by extrusion molding of an elastic material such as rubber and has a sectional shape that is uniform over an entire region in the longitudinal direction.

The neck portion 23 has a thickness in a motion direction (lateral direction in the drawing) of the blade rubber 20 set to be thinner than that of the main body portion 21 and the lip portion 22, and therefore easily elastically deformable. Thus, when the wiper blade 10 moves to the forward side and the backward side on the front glass 12, the lip portion 22 is allowed to be tilted, and in turn, the tip portion of the lip portion 22 can smoothly follow in a moving direction of the wiper blade 10. Therefore, extraneous matter (not shown) such as rain water and dirt on the front glass 12 can be reliably wiped out.

As shown in FIGS. 1, 2, and 4, the holder member 30 includes: a holder main body 31 and a fin portion 32. The holder main body 31 and the fin portion 32 are integrated by two-color molding of materials different in hardness from each other, and they are long, and similarly in length to the blade rubber 20.

The holder main body 31 is formed of resin material such as flexible plastic, and can follow a curved surface (not shown) of the front glass 12 while having a strength sufficient to hold the main body portion 21 of the blade rubber 20. On the other hand, the fin portion 32 is formed of elastic material such as rubber, and lower in hardness than the holder main body 31. With traveling wind hitting the fin portion 32, a downforce is applied to the wiper blade 10, thereby favorably holding the wiping-out performance of the blade rubber 20.

As shown in FIG. 4, paired vertebrae 33 are provided inside the holder main body 31 and spaced apart from each other at a predetermined distance. The vertebrae 33 are each formed of steel plate with spring properties, and are disposed so as to interpose the main body portion 21 of the blade rubber 20 from the forward side and the backward side to have a mirror image relation. In a natural state in which no external force is applied, each vertebra 33 is curved with a curvature larger than the curvature of the front glass 12, and causes the holder member 30 and the blade rubber 20 to be elastically deformed in accordance the curvature of the front glass 12. With this construction, the entire region of the lip portion 22 in the longitudinal direction is brought into intimate contact with the front glass 12.

As shown in FIGS. 1, 2, 3, and 5, the coupling member 40 is provided to an intermediate portion of the holder member 30 in the longitudinal direction. The coupling member 40 includes: a coupling main body 41; a base plate 42; and a cover member 43. The coupling main body 41 has a section formed in a substantially U-shape by press working and the like of a steel plate, and is swaged and fixed to each vertebra 33 by integrally-provided fixing leg portions (not shown).

To the coupling main body 41, a columnar pin 44 made of a steel plate is swaged and fixed. To this columnar pin 44, a hook attachment member 45 formed of resin material such as plastic is rotatably attached. Here, to the hook attachment member 45, a U-shaped hook (not shown) formed at the tip portion of the wiper arm 11 is coupled with a single touch. That is, the wiper arm 11 is coupled to the coupling member 40.

The base plate 42 is formed of resin material such as plastic into a plate shape. This base plate 42 is attached to each vertebra 33 by integrally-provided fixing leg portions 42a. Here, the coupling main body 41 is disposed on the same side as a fin portion 32 (front side) of the holder member 30, and the base plate 42 is disposed on the same side as a holder main body 31 (rear side) of the holder member 30.

The cover member 43 is formed of resin material such as plastic into a substantially box shape, and attached to the outside of the coupling main body 41 by a plurality of integrally-provided engaging claws (not shown). This cover member 43 covers side surface portions of the coupling main body 41 and so forth, thereby enhancing the appearance of the wiper blade 10.

As shown in FIGS. 1, 2, 3 and 5, the washer apparatus 50 is provided to the intermediate portion of the holder member 30 in the longitudinal direction. The washer apparatus 50 is provided in the vicinity of a coupling portion CN between the wiper arm 11 and the wiper blade 10 (see FIGS. 2 and 3). More specifically, the washer apparatus 50 is attached via an engaging claw and the like (not shown) to the coupling member 40, forming the coupling portion CN, without rattling.

The washer apparatus 50 includes: a forward-side washer mechanism 51a; and a backward-side washer mechanism 51*b* so that the blade rubber 20 is sandwiched between them. The washer mechanisms 51*a* and 51*b* are fixed to the coupling member 40, and symmetrically disposed with respect to the blade rubber 20.

Here, the washer apparatus 50 has a length in the longitudinal direction of the blade rubber 20, which is set to be slightly shorter than that of the coupling member 40 in the longitudinal direction of the blade rubber 20.

The forward-side washer mechanism 51*a* and the backward-side washer mechanism 51*b* respectively include a forward-side channel block 52 and a backward-side channel block 53, which are different in shape from each other. Each of the forward-side channel block 52 and the backward-side channel block 53 is formed of resin material such as plastic, and formed into a stepped box shape.

The forward-side channel block 52 is provided on a forward side of the blade rubber 20, and includes an inner-peripheral-side wall 52*a*, an outer-peripheral-side wall 52*b*, a rear-side wall 52*c*, a front-side wall 52*d*, and a forward-side wall 52*e*. Here, the inner-peripheral-side wall 52*a* and the outer-peripheral-side wall 52*b* are disposed to face each other, and the rear-side wall 52*c* and the front-side wall 52*d* are disposed to face each other. Of these walls, the front-side wall 52*d* is formed stepwise as shown in FIG. 2.

The rear-side wall 52*c* facing the front glass 12 is provided with a plurality of forward-side injection nozzles A1, B1, and C1 as shown in FIG. 3. In the first embodiment, three forward-side injection nozzles A1, B1, and C1 are provided. These forward-side injection nozzles A1, B1, and C1 are disposed so as to align substantially equidistantly along the longitudinal direction of the blade rubber 20. Each of the forward-side injection nozzles A1, B1, and C1 is formed in a substantially spherical shape as shown in FIG. 5 so as to adjust an injecting direction of washer liquid "W" (see FIGS. 3 and 6).

Each of the forward-side injection nozzles A1, B1, and C1 is oriented to a forward side of the blade rubber 20. More specifically, as shown in FIG. 3, the forward-side injection nozzle A1 on an outer peripheral side of the rear-side wall 52*c* is oriented to the forward side and the outer peripheral side of the blade rubber 20. With this, at the time of forward-side wiping-out motion of the wiper blade 10, the forward-side injection nozzle A1 injects the washer liquid "W" to an injection position A2 of FIG. 6. That is, the forward-side injection nozzle A1 is provided at a position for wetting an outer peripheral side end on one side (outer peripheral side) in the longitudinal direction of the blade rubber 20.

Also, the forward-side injection nozzle B1 at an intermediate portion of the rear-side wall 52*c* in the longitudinal direction is oriented to the forward side of the blade rubber 20 and a direction orthogonal to the longitudinal direction of the blade rubber 20. With this, at the time of forward-side wiping-out motion of the wiper blade 10, the forward-side injection nozzle B1 injects the washer liquid "W" to an injection position B2 of FIG. 6.

Furthermore, the forward-side injection nozzle C1 on an inner peripheral side of the rear-side wall 52*c* is oriented to the forward side and the inner peripheral side of the blade rubber 20. With this, at the time of forward-side wiping-out motion of the wiper blade 10, the forward-side injection nozzle C1 injects the washer liquid "W" to an injection position C2 of FIG. 6. That is, the forward-side injection nozzle C1 is provided to a position for wetting an inner peripheral side end on the other side (inner peripheral side) in the longitudinal direction of the blade rubber 20.

Here, each of the injection positions A2 to C2 of FIG. 6 indicates a position to be wetted with the washer liquid "W" with movement of the wiper blade 10 to the forward side. With movement of the wiper blade 10 to the forward side, an injection area in a substantially arc shape is formed.

In this manner, of the three forward-side injection nozzles A1, B1, and C1, the forward-side injection nozzles A1 and C1 on both sides in the longitudinal direction of the blade rubber 20 are oriented to the one side (outer peripheral side) in the longitudinal direction and the other side (inner peripheral side) in the longitudinal direction of the blade rubber 20, respectively. Therefore, as shown in FIG. 6, a relatively wide area inside a wiping-out area "AR" is wetted with the washer liquid "W". If a diffusion-type nozzle which injects the washer liquid "W" in a mist manner is used, it is possible to wet a wider area inside the wiping-out area "AR".

Also, by adjusting the orientations of the three forward-side injection nozzles A1, B1, and C1, a relatively wide area inside the wiping-out area "AR" gets wet. Thus, the length dimension of the forward-side washer mechanism 51*a* along the longitudinal direction of the blade rubber 20 can be shortened. Therefore, the channel through which the washer liquid "W" passes before injected can be made shorter than ever. Thus, power consumption of the washer pump (not shown) can be reduced while the washer liquid "W" is inhibited from being frozen.

The backward-side channel block 53 is provided on a backward side of the blade rubber 20, and includes an inner-peripheral-side wall 53*a*, an outer-peripheral-side wall 53*b*, a rear-side wall 53*c*, a front-side wall 53*d*, and a backward-side wall 53*e*. Here, the inner-peripheral-side wall 53*a* and the outer-peripheral-side wall 53*b* are disposed to face each other, and the rear-side wall 53*c* and the front-side wall 53*d* are disposed to face each other. Of these walls, the front-side wall 53*d* is formed stepwise as shown in FIG. 2.

The rear-side wall 53*c* facing the front glass 12 is provided with a plurality of backward-side injection nozzles D1 and E1 as shown in FIG. 3. In the first embodiment, two backward-side injection nozzles D1 and E1 are provided. These backward-side injection nozzles D1 and E1 are disposed so as to align along the longitudinal direction of the blade rubber 20 at a distance substantially equal to that of the forward-side injection nozzles A1, B1, and C1.

Here, one backward-side injection nozzle D1 is disposed between the forward-side injection nozzles A1 and B1 along the longitudinal direction of the blade rubber 20, and the other backward-side nozzle E1 is disposed between the forward-side injection nozzles B1 and C1 along the longitudinal direction of the blade rubber 20. Also, each of the backward-side injection nozzles D1 and E1 is formed in a substantially spherical shape similar to that of each of the forward-side injection nozzles A1, B1 and C1 so as to adjust an injecting direction of washer liquid "W" (see FIGS. 3 and 7).

Each of the backward-side injection nozzles D1 and E1 is oriented to a backward side of the blade rubber 20. More specifically, as shown in FIG. 3, the backward-side injection nozzle D1 on an outer peripheral side of the rear-side wall 52*c* is oriented to the backward side and the outer peripheral side of the blade rubber 20. With this, at the time of backward-side wiping-out motion of the wiper blade 10, the backward-side injection nozzle D1 injects the washer liquid "W" to an injection position D2 of FIG. 7.

On the other hand, the backward-side injection nozzle E1 on an inner peripheral side of the rear-side wall 52*c* is oriented to the backward side and the inner peripheral side of the blade rubber 20. With this, at the time of backward-side wiping-out motion of the wiper blade 10, the backward-side injection nozzle E1 injects the washer liquid "W" to an injection position E2 of FIG. 7.

Here, each of the injection positions D2 and E2 of FIG. 7 indicates a position to be wetted with the washer liquid "W" with movement of the wiper blade 10 to the backward side. With movement of the wiper blade 10 to the backward side, an injection area in a substantially arc shape is formed.

In this manner, the backward-side injection nozzles D1 and E1 are oriented to the one side (outer peripheral side) in the longitudinal direction and the other side (inner peripheral side) in the longitudinal direction of the blade rubber 20, respectively. Therefore, as shown in FIG. 8, an area between the injection positions A2 and B2 and an area between the injection positions B2 and C2 inside the wiping-out area "AR" can be wetted with the washer liquid "W".

That is, the injection positions A2, B2, and C2 of the washer liquid "W" injected from the forward-side injection nozzles A1, B1, and C1 and the injection positions D2 and E2 of the washer liquid "W" from the backward-side injection nozzles D1 and E1 are shifted in the longitudinal direction of the blade rubber 20. With this, the injection positions are alternately aligned in a manner such as A2, D2, B2, E2, and C2, and the injection positions A2 to E2 on the front glass 12 are alternately arranged as shown in FIG. 8 on the forward side and the backward side of the blade rubber 20.

Therefore, at the time of forward-side wiping-out motion of the wiper blade 10, as shown in FIG. 6, an area not wetted with the washer liquid "W" is formed between the injection positions A2 and B2 and between the injection positions B2 and C2. On the other hand, at the tie of backward-side wiping-out motion of the wiper blade 10, as shown in FIG. 7, only the injection positions D2 and E2 are wetted with the washer liquid "W", which are narrower areas compared with those at the time of forward-side wiping-out motion. With this, in both of forward-side and backward-side wiping-out motions of the wiper blade 10, visibility of the driver via the windshield can be favorably kept.

Here, the forward-side injection nozzle A1 on the outermost peripheral side of the blade rubber 20 among the plurality of (three) forward-side injection nozzles A1, B1, and C1 is arranged on a further outer peripheral side of the blade rubber 20 than the backward-side injection nozzle D1 on the outermost peripheral side of the blade rubber 20 among the plurality of (two) backward-side injection nozzles D1 and E1. Also, the forward-side injection nozzle C1 on the innermost peripheral side of the blade rubber 20 among the plurality of (three) forward-side injection nozzles A1, B1, and C1 is arranged on a further inner peripheral side of the blade rubber 20 than the backward-side injection nozzle E1 on the innermost peripheral side of the blade rubber 20 among the plurality of (two) backward-side injection nozzles D1 and E1.

With this, at the time of forward-side wiping-out motion less prone to receive influences such as travelling wind of the vehicle or the like with the wiper blade 10 serving as a wall, both end portions of the blade rubber 20 are effectively wetted by the forward-side injection nozzles A1 and C1. On the other hand, at the time of backward-side wiping-out motion prone to receive influences such as travelling wind of the vehicle, portions near the backward-side injection nozzles D1 and E1 are wetted as much as possible. Therefore, while the injection amount of the washer liquid "W" is minimized as required, discharge pressure of the washer pump can be decreased and, in turn, the washer pump can be simplified (cost-cutting can be achieved).

By adopting diffusion-type nozzles also as the backward-side injection nozzles D1 and E1, a wider area inside the wiping-out area "AR" can get wet.

Here, by adjusting the orientations of the two backward-side injection nozzles D1 and E1, portions not sufficiently wetted at the time of forward-side wiping-out motion (those between the injection positions A2 and B2 and between the injection positions B2 and C2) are wetted with the washer liquid "W". Therefore, in wiping-out motion of the blade rubber 20 for one reciprocation, the front glass 12 can uniformly get wet.

Furthermore, as with the forward-side washer mechanism 51a, the length dimension of the backward-side washer mechanism 51b along the longitudinal direction of the blade rubber 20 can be shortened. Therefore, the channel through which the washer liquid "W" passes before injected can be made shorter than ever. Thus, power consumption of the washer pump (not shown) can be reduced while the washer liquid "W" is inhibited from being frozen.

To the inner-peripheral-side wall 52a of the forward-side channel block 52 and the inner-peripheral-side wall 53a of the backward-side channel block 53, a forward-side tube insertion unit 52f and a backward-side tube insertion unit 53f are integrally provided, respectively, as shown in FIG. 2 and FIG. 3. To each of the forward-side tube insertion unit 52f and the backward-side tube insertion unit 53f, one end side of a rubber tube (not shown) is inserted.

Here, to the other end side of the rubber tube, the washer pump installed inside the engine room of the vehicle is connected. Also, the rubber tubes are arranged on the inner peripheral side along the longitudinal direction of the blade rubber 20, thereby making the other end side of the rubber tube easily introduced into the engine room.

Then, by operating a washer switch, the washer pump is driven. Then, as two-dot-chain lines with arrows in FIGS. 1 and 2, the washer liquid "W" is supplied via the rubber tubes to the inside of the forward-side channel block 52 and the backward-side channel block 53. Here, by switching driving of the washer pump, the washer liquid "W" is supplied only to the forward-side channel block 52 at the time of forward-side wiping-out motion of the wiper blade 10, and the washer liquid "W" is supplied only to the backward-side channel block 53 at the time of backward-side wiping-out motion of the wiper blade 10.

Next, the motion of thus-formed wiper blade 10 is described in detail with reference to the drawings.

The forward-side wiping-out motion is motion of the wiper blade 10 moving upward from a lower reverse position in the wiping-out area "AR" on the front glass 12 and then moving to an upper reverse position, as shown in FIG. 6.

As indicated by a solid line with an arrow (forward side) of FIG. 6, when the washer switch is turned ON with the wiper blade 10 moving to the forward side, the washer liquid "W" is injected from the forward-side injection nozzles A1, B1, and C1 (see FIG. 3). With this, the injection positions A2, B2, and C2 shown in FIG. 6 are wetted with the washer liquid "W". Here, between the injection positions A2 and B2 and between the injection positions B2 and C2, a slight amount of washer liquid "W" is supplied by travelling wind of the vehicle or the like. Therefore, the occurrence of a trouble due to dry contact of the wiper blade 10 with the front glass 12 (such as damage on the front glass 12 and uneven wear of the blade rubber 20) can be inhibited. In this manner, the front glass 12 is wetted with the washer liquid "W", and attachments such as dust on the front glass 12 can be cleanly wiped out.

The backward-side wiping-out motion is motion of the wiper blade 10 moving downward from the upper reverse position in the wiping-out area "AR" on the front glass 12 and then moving to the lower reverse position, as shown in FIG. 7.

As indicated by a solid line with an arrow (backward side) of FIG. 7, when the washer switch is turned ON with the wiper blade 10 moving to the backward side, the washer liquid "W" is injected from the backward-side injection nozzles D1 and E1. With this, the injection positions D2 and E2 shown in FIG. 7 are wetted with the washer liquid "W". Here, the injection positions D2 and E2 are portions between the injection positions A2 and B2 and between the injection positions B2 and C2, respectively, the portions corresponding to those insufficiently wetted at the time of forward-side wiping-out motion. Therefore, as indicated by the injection positions A2 to E2 of FIG. 8, in wiping-out motion of the blade rubber 20 (wiper blade 10) for one reciprocation, the front glass 12 can uniformly get wet. With this, attachments such as dust on the front glass 12 can be cleanly wiped out.

Here, portions other than the injection positions D2 and E2 shown in FIG. 7 get wet at the time of forward-side wiping-out motion and, furthermore, are supplied with a slight amount of washer liquid "W" by travelling wind of the vehicle or the like. Therefore, even at the time of backward-side wiping-out motion, the occurrence of a trouble due to dry contact of the wiper blade 10 with the front glass 12 can be inhibited.

Also, the number of the forward-side injection nozzles A1, B1, and C1 (three) is larger than the number of the backward-side injection nozzles D1 and E1 (two). With this, as shown in FIGS. 6 and 7, the amount of washer liquid "W" at the time of forward-side wiping-out motion is larger than the amount of washer liquid "W" at the time of backward-side wiping-out motion. This is because it is desirable to wet the dried surface of the front glass 12 as widely as possible at the start of operation of the wiper blade 10 stopping at the lower reverse position.

As described in detail above, according to the wiper blade 10 of the first embodiment, the injection positions A2, B2, and C2 of the washer liquid "W" injected from the forward-side injection nozzles A1, B1, and C1 and the injection positions D2 and E2 of the washer liquid "W" injected from the backward-side injection nozzles D1 and E1 are alternately aligned as being shifted in the longitudinal direction of the blade rubber 20.

Therefore, on the forward side and the backward side of the blade rubber 20, the injection positions A2 to E2 on the front glass 12 are differently and alternately disposed. Furthermore, in wiping-out motion of the blade rubber 20 for one reciprocation, the front glass 12 can uniformly get wet. Thus, the total number of injection nozzles (five in the first embodiment) can be made less than ever and, in turn, the consumption amount of the washer liquid "W" at the time of reciprocating wiping-out motion of the blade rubber 20 can be reduced. Thus, power consumption of the washer pump can be reduced, and the size of the washer pump can be decreased.

The present invention is not restricted to the above-described first embodiment, and it goes without saying that the present invention can be variously modified in a range not deviating from the gist of the present invention. For example, while the wiper blade 10 wipes out the front glass 12 as a windshield in the above-described first embodiment, the present invention is not restricted to this, and the present invention can be applied as wiping out a rear glass as a windshield.

Also, in the above-described first embodiment, three forward-side injection nozzles are provided, two backward-side injection nozzles are provided, and the washer liquid "W" as minimum as required is injected by these five injection nozzles in total. However, the present invention is not restricted to this. In short, one injection nozzle may be provided to each of the forward side and the backward side or six or more injection nozzles in total may be provided to the forward and backward sides as long as the injection position of the washer liquid "W" injected from the forward-side injection nozzle and the injection position of the washer liquid "W" injected from the backward-side injection nozzle can be shifted in the longitudinal direction of the blade rubber 20 or alternately aligned.

Furthermore, in the above-described first embodiment, the forward-side injection nozzles A1, B1, and C1 are provided on the rear-side wall 52c, and the backward-side injection nozzles D1 and E1 are provided on the rear-side wall 53c. However, the present invention is not restricted to this. For example, the forward-side injection nozzles A1, B1, and C1 may be provided on the forward-side wall 52e, and the backward-side injection nozzles D1 and E1 may be provided on the backward-side wall 53e.

Hereinafter, the second embodiment of the present invention will be described in detail with reference to the accompanying drawings.

Figure 9:
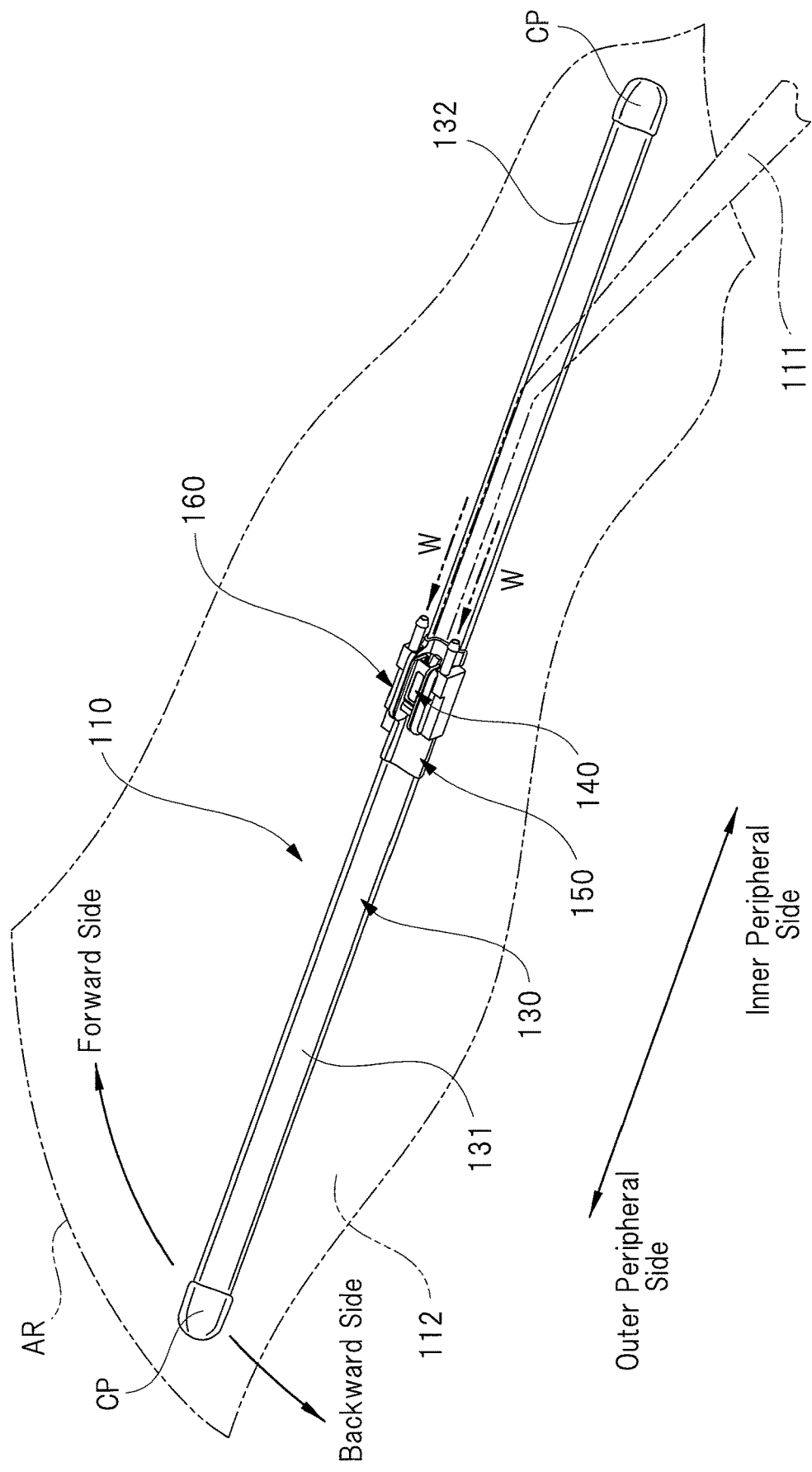
FIG. 9 is a perspective view showing an entire wiper blade of a second embodiment.
Figure 10:
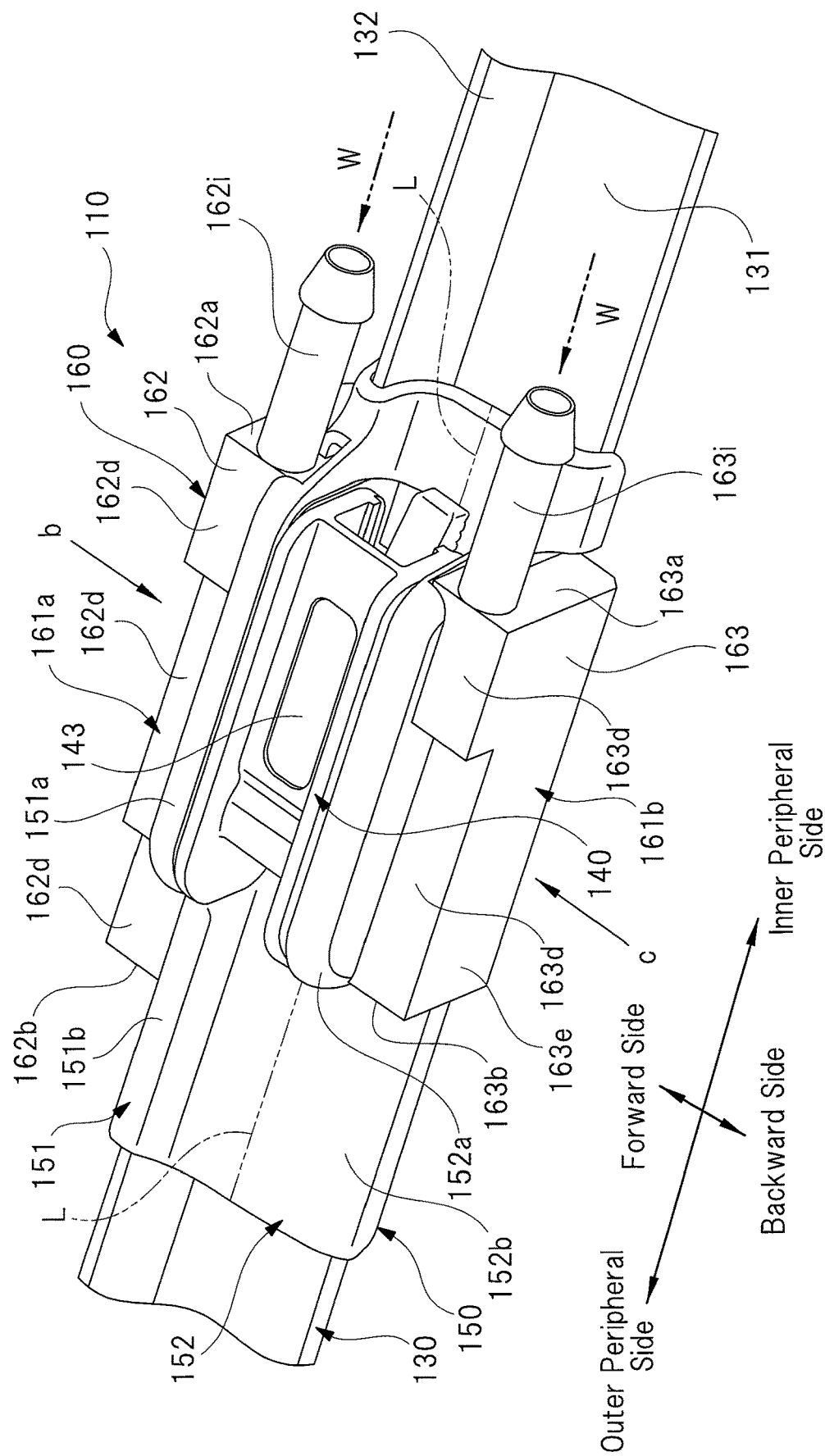
FIG. 10 is an enlarged perspective view of the periphery of a coupling member of the wiper blade of FIG. 9, viewed from a front side.
Figure 11:
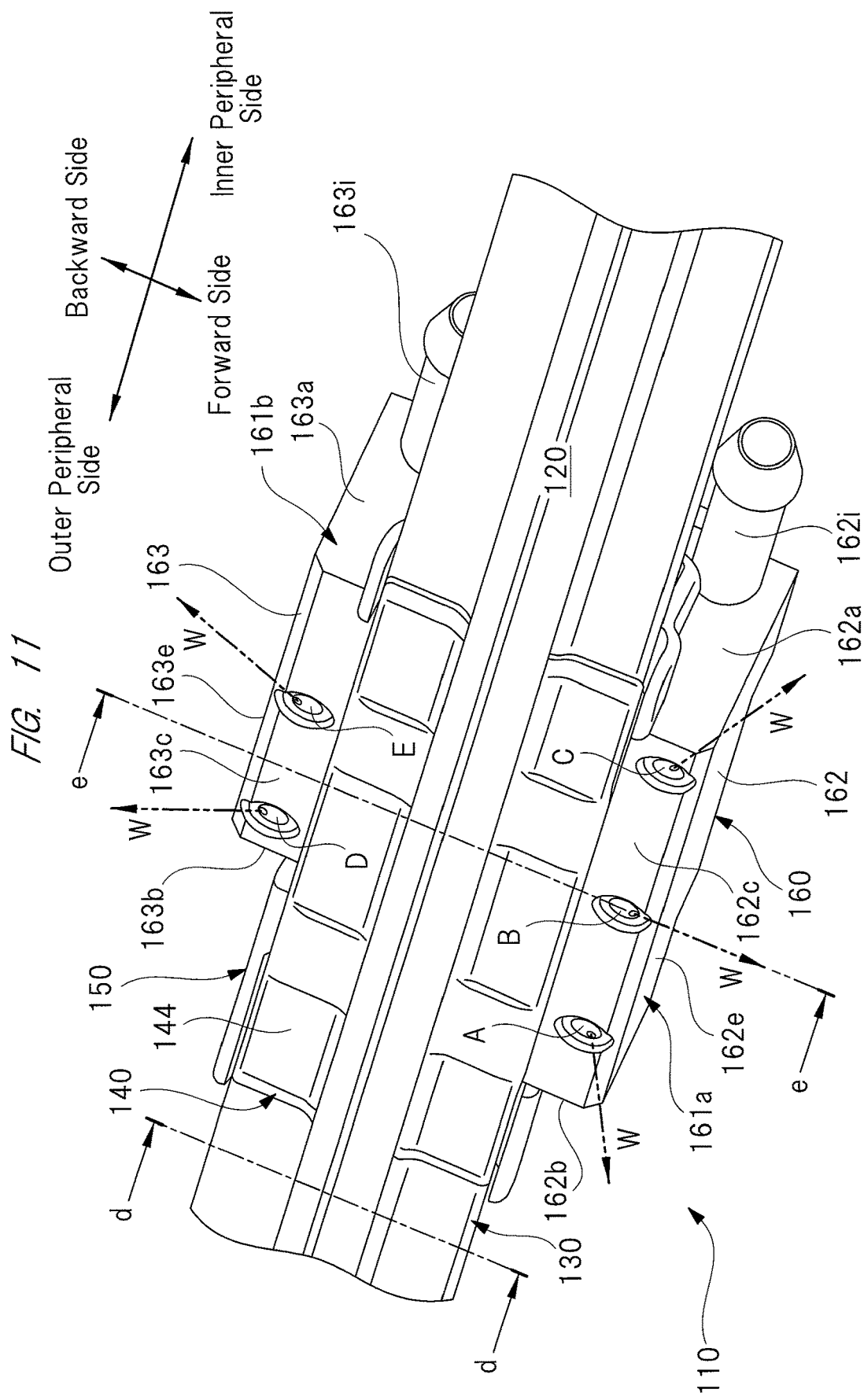
FIG. 11 is an enlarged perspective view of the periphery of the coupling member of the wiper blade of FIG. 9, viewed from a rear side.
Figure 12:
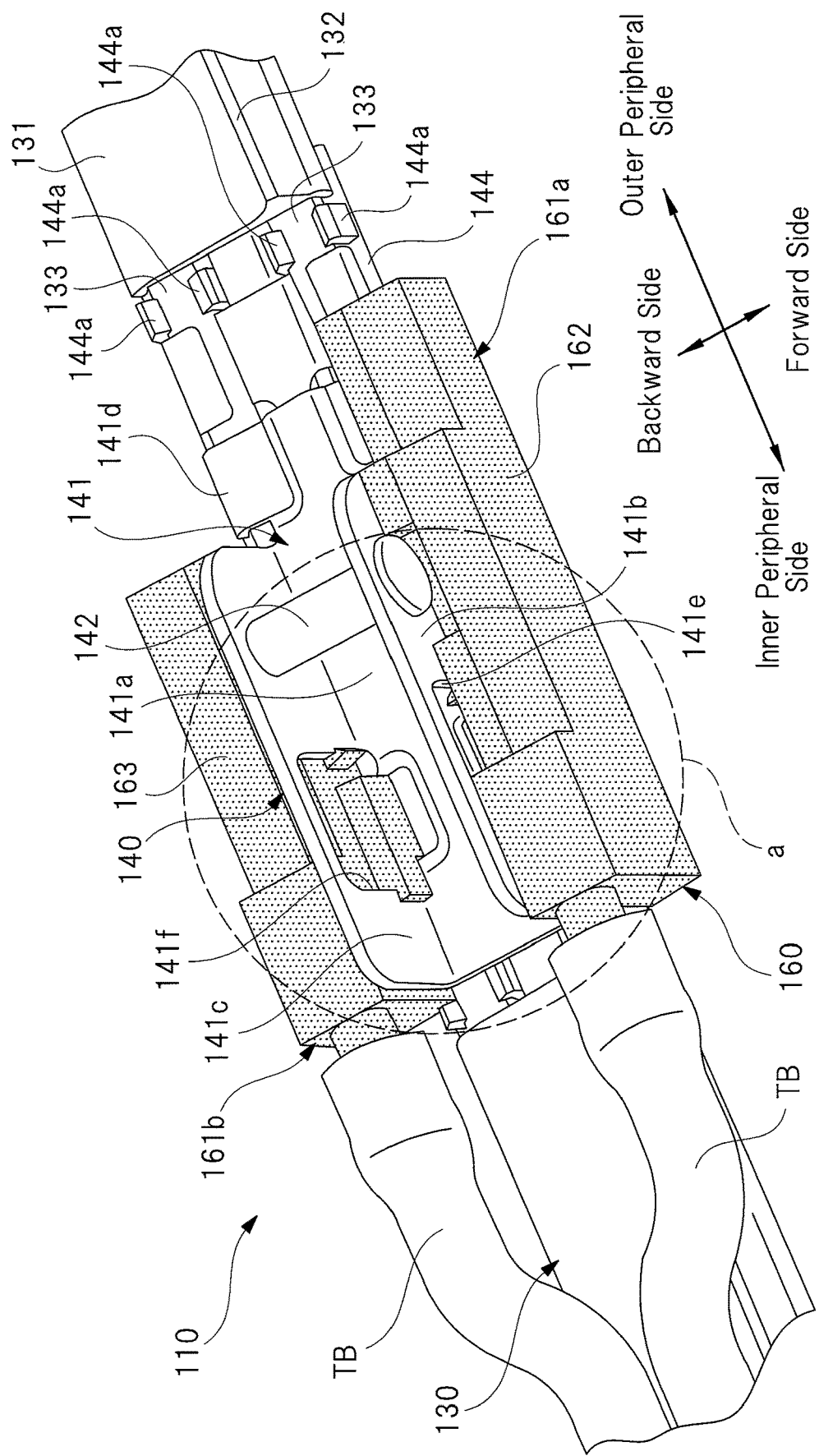
FIG. 12 is an enlarged perspective view for describing a fixing structure of the coupling member and a washer apparatus.
Figure 13:
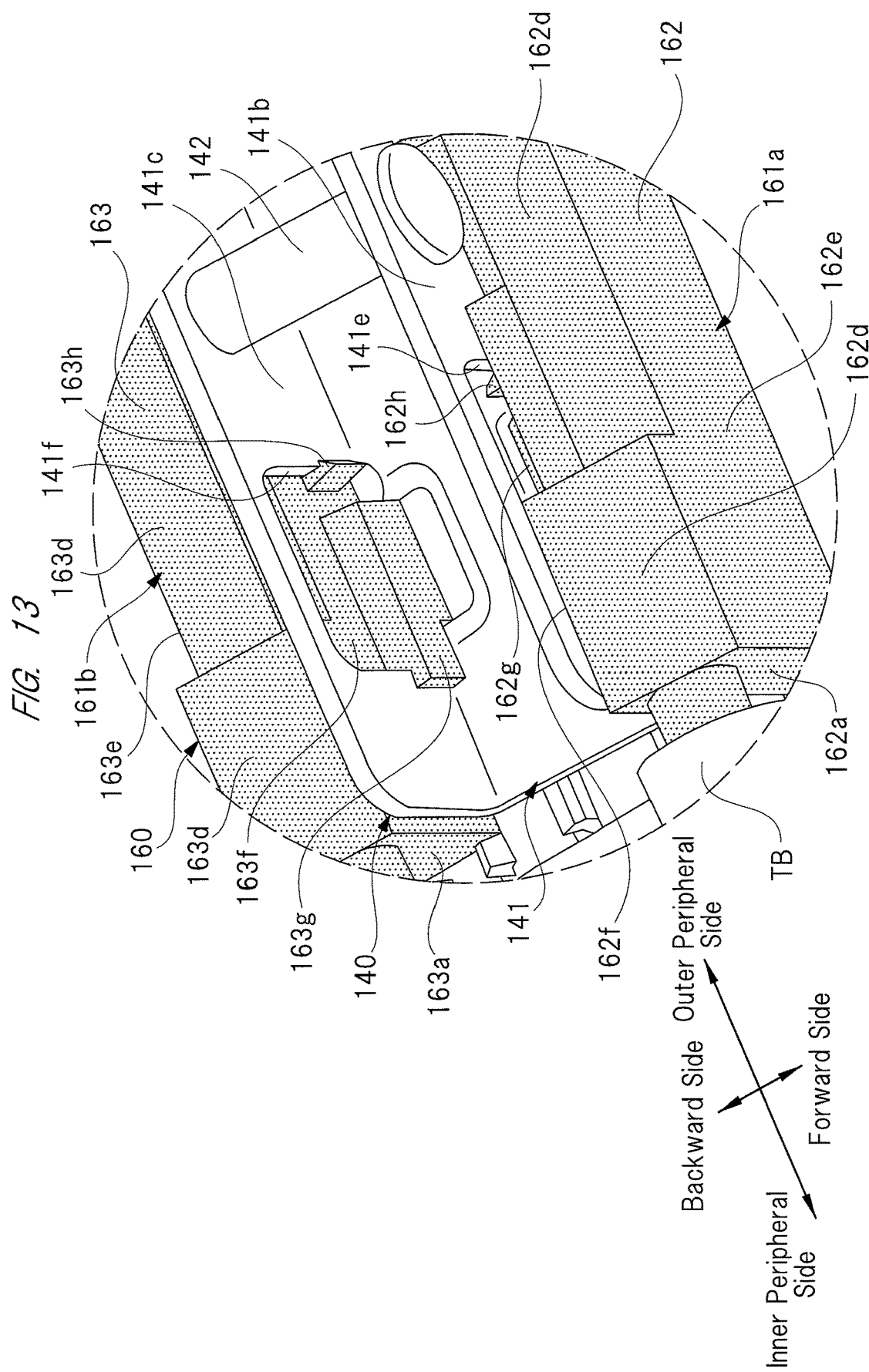
FIG. 13 is an enlarged view of a broken-line circle a of FIG. 12.
Figure 14:
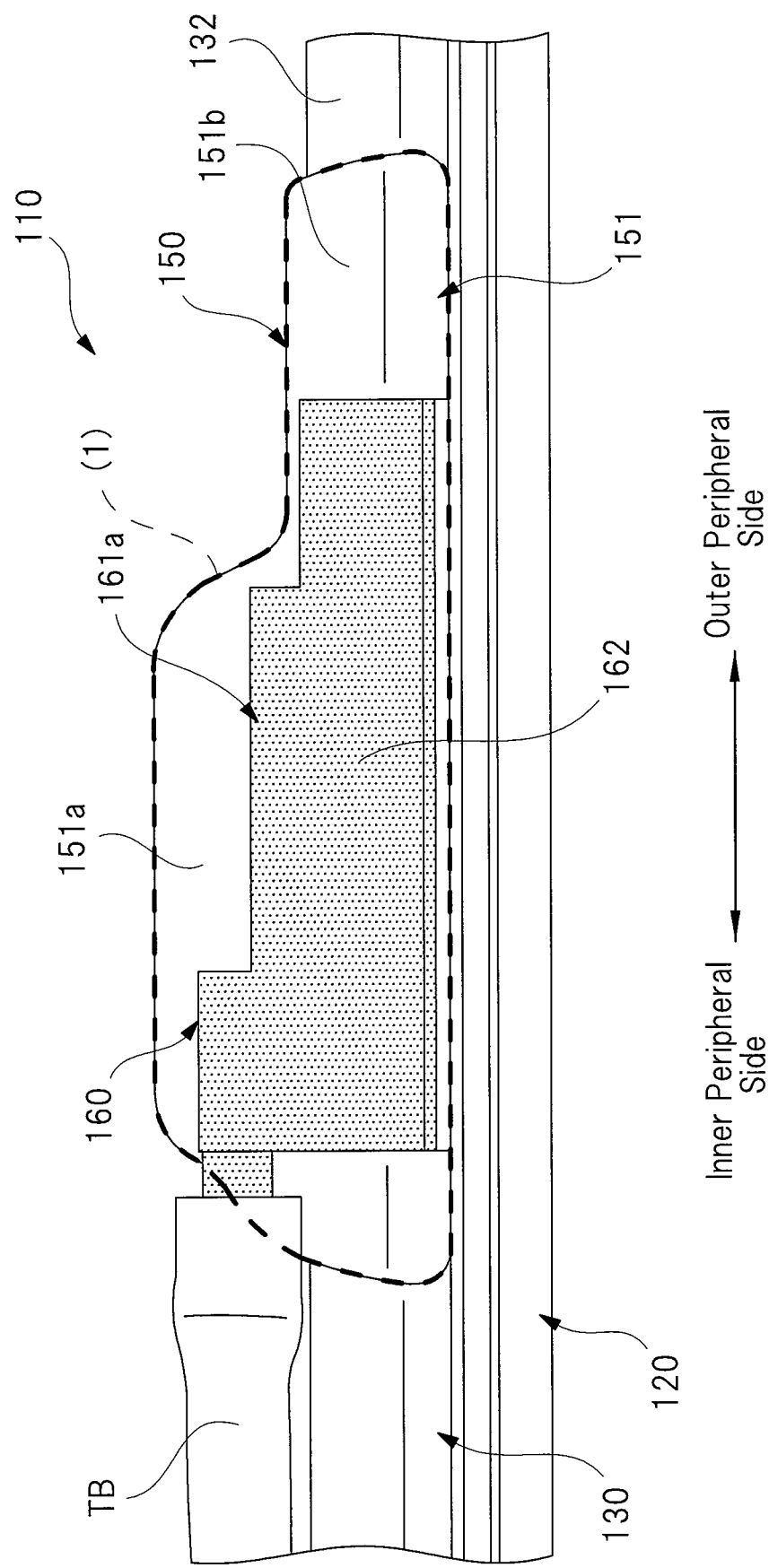
FIG. 14 is a diagram viewed from an arrow "b" of FIG. 10.
Figure 15:
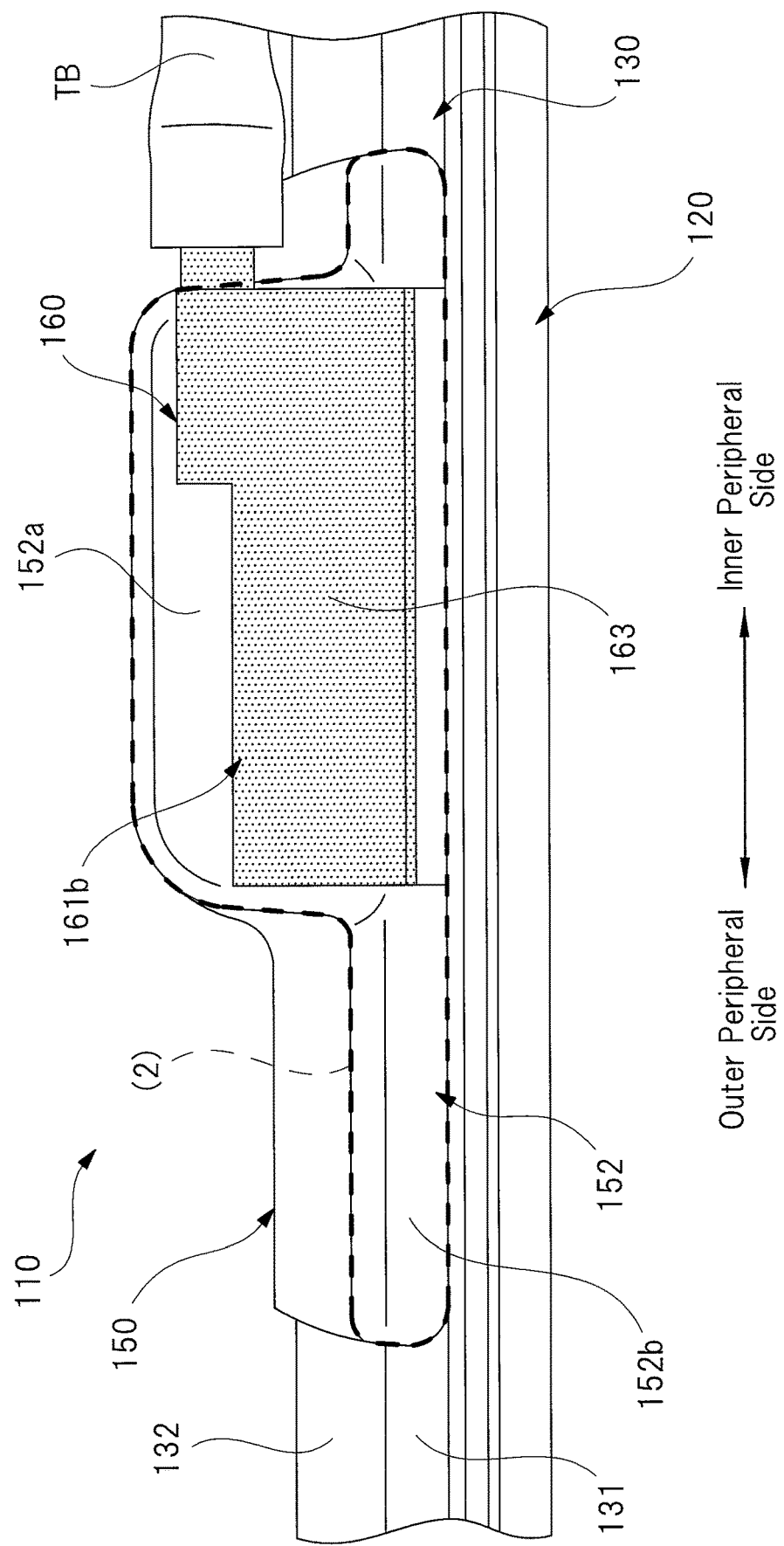
FIG. 15 is a diagram viewed from an arrow "c" of FIG. 10.
Figure 16:
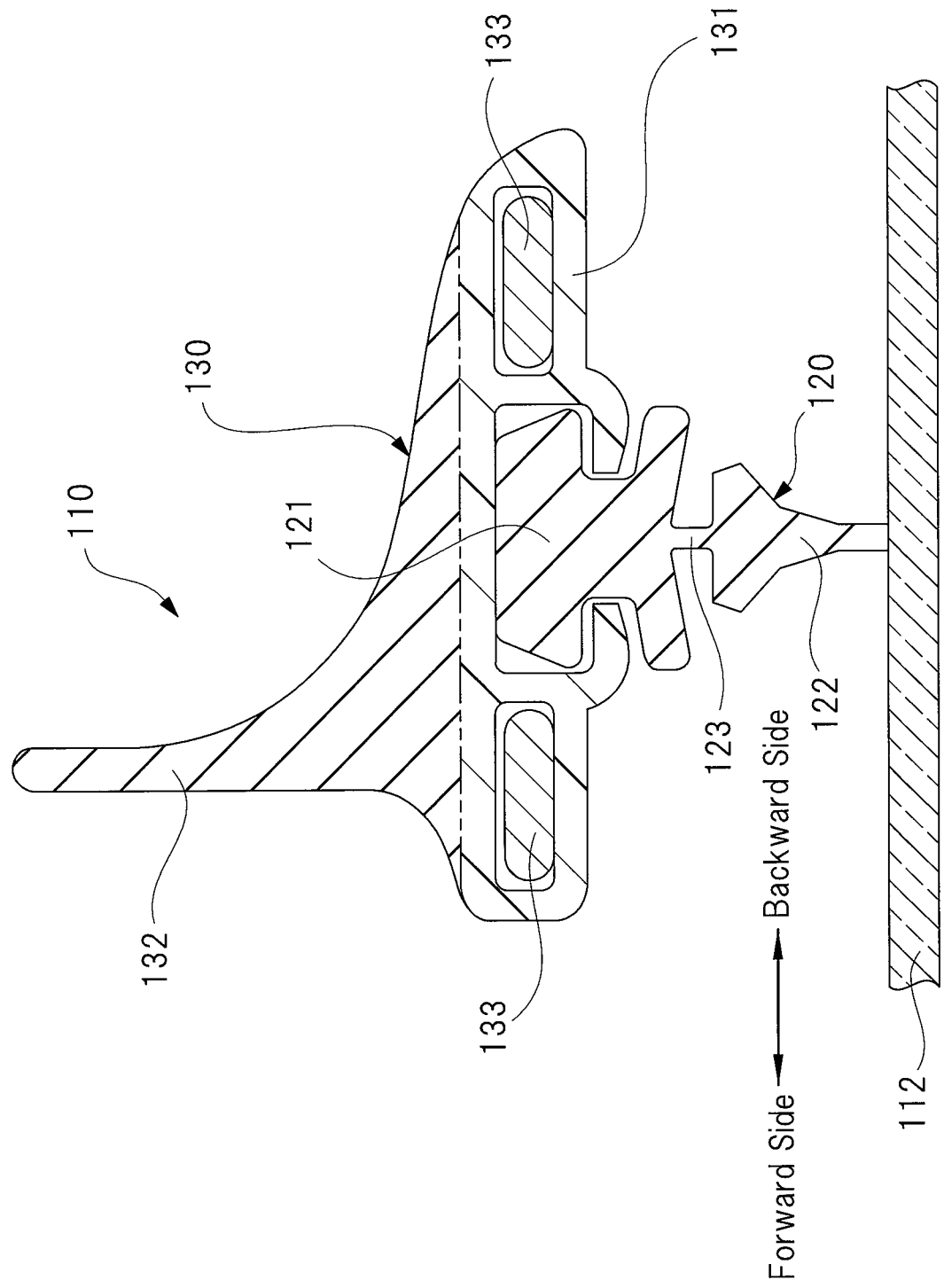
FIG. 16 is a sectional view along a d-d line of FIG. 11.
Figure 17:
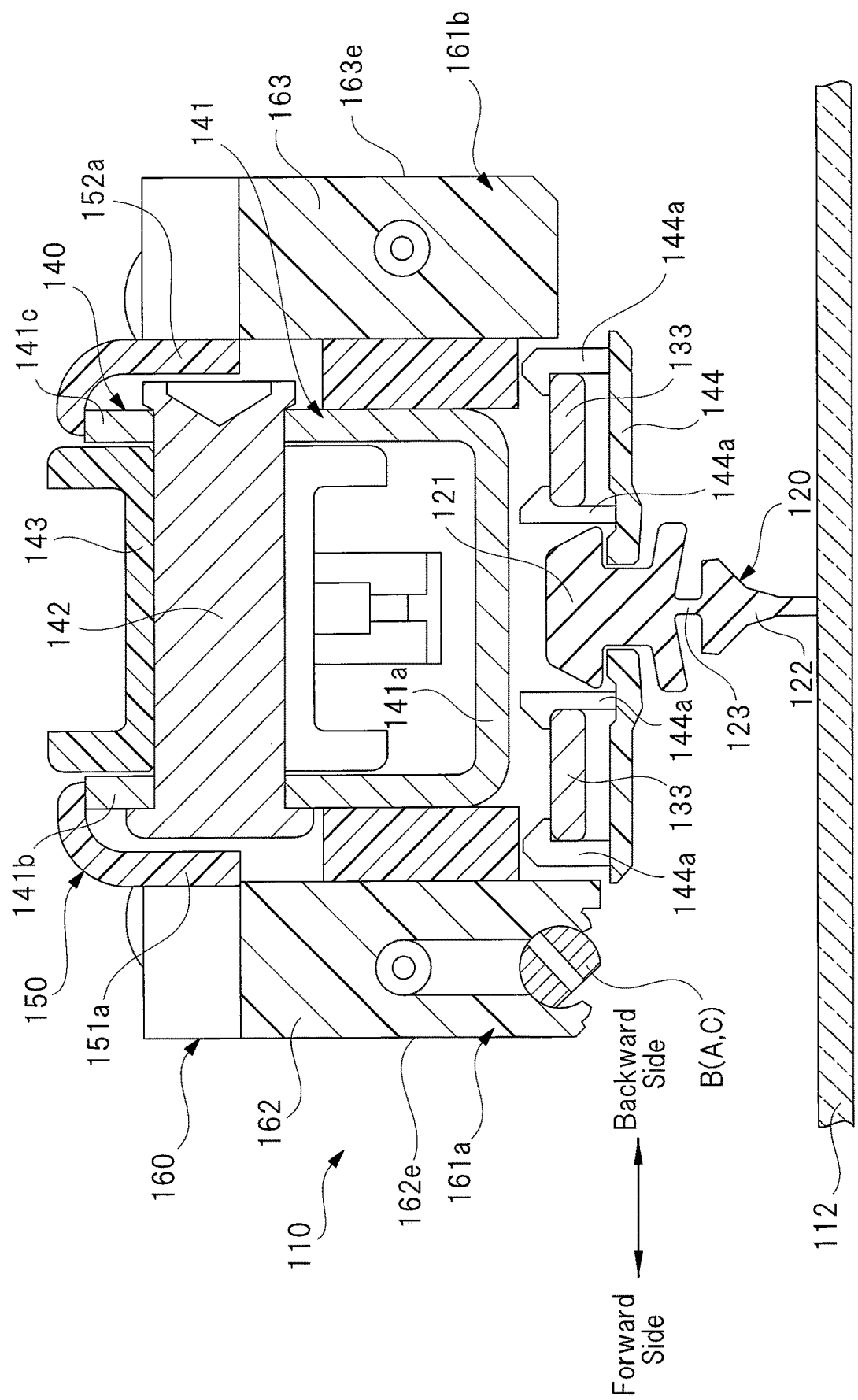
FIG. 17 is a sectional view along an e-e line of FIG. 11.

FIG. 9 is a perspective view showing an entire wiper blade of a second embodiment, FIG. 10 is an enlarged perspective view of the periphery of a coupling member of the wiper blade of FIG. 9, viewed from a front side, FIG. 11 is an enlarged perspective view of the periphery of the coupling member of the wiper blade of FIG. 9, viewed from a rear side, FIG. 12 is an enlarged perspective view for describing a fixing structure of the coupling member and a washer apparatus, FIG. 13 is an enlarged view of a broken-line circle a of FIG. 12, FIG. 14 is a diagram viewed from an arrow "b" of FIG. 10, FIG. 15 is a diagram viewed from an arrow "c" of FIG. 10, FIG. 16 is a sectional view along a d-d line of FIG. 11, and FIG. 17 is a sectional view along an e-e line of FIG. 11.

As shown in FIG. 9, a wiper blade 110 is rotatably attached to a tip portion of a wiper arm 111 provided on a front side (not shown) of a vehicle such as automotive vehicle. With ON operation on a wiper switch (not shown) provided inside a cabin, the wiper arm 111 is driven for swinging with rotational driving of a wiper motor (not shown). This causes the wiper blade 110 to make reciprocating wiping-out motion in a predetermined wiping range "AR" formed on a front glass (windshield) 112 toward a forward side and a backward side as indicated by arrows in the drawing.

As shown in FIGS. 9 to 17, the wiper blade 110 includes: a blade rubber 120 in contact with the front glass 112; a holder member 130 which holds the blade rubber 120; a coupling member 140 provided to an intermediate portion of the holder member 130 in a longitudinal direction; and a cover member 150 covering the coupling member 140, and a washer apparatus 160 fixed to the coupling member 140.

Here, paired end caps "CP" are attached to both end portions of the holder member 130 in the longitudinal direction, thereby preventing the blade rubber 120 held by the holder member 130 from falling out.

As shown in FIGS. 16 and 17, the blade rubber 120 includes: a main body portion 121 held by the holder member 130; a lip portion 122 in contact with the front glass 112; and a neck portion 123 which couples the main body portion 121 and the lip portion 122 to each other. Note that the blade rubber 120 is formed so as to be long by extrusion molding of an elastic material such as rubber and has a sectional shape that is uniform over an entire region in the longitudinal direction.

The neck portion 123 has a thickness in a motion direction (lateral direction in the drawing) of the blade rubber 120 set to be thinner than that of the main body portion 121 and the lip portion 122, and therefore easily elastically deformable. Thus, when the wiper blade 110 moves to the forward side and the backward side on the front glass 112, the lip portion 122 is allowed to be tilted, and in turn, the tip portion of the lip portion 122 can smoothly follow in a moving direction of the wiper blade 110. Therefore, extraneous matter (not shown) such as rain water and dirt on the front glass 112 can be reliably wiped out.

As shown in FIGS. 9, 10, and 16, the holder member 130 includes a holder main body 131 and a fin portion 132. The holder main body 131 and the fin portion 132 are integrated by two-color molding of materials different in hardness from each other, and they are long, and similarly in length to the blade rubber 120.

The holder main body 131 is formed of resin material such as flexible plastic, and can follow a curved surface (not shown) of the front glass 112 while having a strength sufficient to hold the main body portion 121 of the blade rubber 120. On the other hand, the fin portion 132 is formed of elastic material such as rubber, and lower in hardness than the holder main body 131. That is, the holder member 130 including a holder main body 131 and a fin portion 132 has an elastic characteristic. With traveling wind hitting the fin portion 132, a downforce is applied to the wiper blade 110, thereby favorably holding the wiping-out performance of the blade rubber 120.

As shown in FIG. 16, paired vertebrae 133 are provided inside the holder main body 131 and spaced apart from each other at a predetermined distance. The vertebrae 133 are each formed of steel plate with spring properties, and are disposed so as to interpose the main body portion 121 of the blade rubber 120 from the forward side and the backward side to have a mirror image relation. In a natural state in which no external force is applied, each vertebra 133 is curved with a curvature larger than the curvature of the front glass 112, and causes the holder member 130 and the blade rubber 120 to be elastically deformed in accordance with the curvature of the front glass 112. With this construction, the entire region of the lip portion 122 in the longitudinal direction is brought into intimate contact with the front glass 112.

As shown in FIGS. 9 to 13 and FIG. 17, the coupling member 140 is provided to an intermediate portion of the holder member 130 in the longitudinal direction. This coupling member 140 is composed of a coupling main body 141, a columnar pin 142, a hook attachment member 143, and a base plate 144, which have stiffness higher than that of the holder member 130.

The coupling main body 141 has a section formed in a substantially "U" shape by pressing working of a steel plate. The coupling main body 141 includes a bottom wall unit 141a, and a forward-side wall unit 141b and a backward-side wall unit 141c each integrally provided to the bottom wall unit 141a and disposed to face each other. To the bottom wall unit 141a, a plurality of fixing leg units 141d (only one is shown in FIG. 12) are integrally provided. With these fixing leg units 141d swaged and fixed to each vertebra 133, the coupling main body 141 is strongly fixed to each vertebra 133. Here, the coupling main body 141 includes a function of holding the respective vertebrae 133 with predetermined spacing.

Between the forward-side wall unit 141b and the backward-side wall unit 141c, the columnar pin 142 made of steel material is swaged and fixed. To the columnar pin 142, the hook attachment member 143 formed of resin material such as plastic into a predetermined shape is rotatably attached. Here, to the hook attachment member 143, a U-shaped hook (not shown) formed at the tip portion of the wiper arm 111 is coupled with a single touch. That is, the wiper arm 111 is coupled to the coupling member 140.

The forward-side wall unit 141b and the backward-side wall unit 141c are provided with a forward-side attachment hole 141e and a backward-side attachment hole 141f, respectively, as attachment holes that are open in a direction crossing (orthogonal to) the longitudinal direction of the blade rubber 120. As shown in FIGS. 12 and 13, the forward-side attachment hole 141e and the backward-side attachment hole 141f are each formed in a substantially rectangular shape, and face each other from the direction orthogonal to the longitudinal direction of the blade rubber 120. To the forward-side attachment hole 141e and the backward-side attachment hole 141f, positioning claws 162g and 163g and retaining claws 162h and 163h of the forward-side channel block 162 and the backward-side channel block 163, respectively, are inserted and fixed.

The base plate 144 is formed of resin material such as plastic in a plate shape as shown in FIG. 17. To this base plate 144, a plurality of fixing leg units 144a are integrally provided. Each fixing leg unit 144a of the base plate 144 is attached to each vertebra 133. With this, the base plate 144 is fixed to each vertebra 133. Here, the coupling main body 141 is disposed on the same side as a fin unit 132 (front side) of the holder member 130, and the base plate is disposed on the same side as a holder main body 131 (rear side) of the holder member 130.

As shown in FIGS. 10, 14, and 15, the cover member 150 is formed of resin material such as plastic in a substantially box shape, and attached to the coupling main body 141 by a plurality of integrally-provided engaging claws (not shown). This cover member 150 is provided between the coupling member 140 and the washer apparatus 160 with respect to the direction crossing the longitudinal direction of the blade rubber 120 to cover the periphery of the coupling main body 141 forming the coupling member 140 and fill a gap between the coupling member 140 and the washer apparatus 160, thereby enhancing the appearance of the wiper blade 110.

The cover member 150 includes a forward-side cover unit 151 and a backward-side cover unit 152. The forward-side cover unit 151 and the backward-side cover unit 152 are integrated on an imaginary line "L" shown in FIG. 10 as a boundary. The forward-side cover unit 151 is provided and interposed between the forward-side wall unit 141b and the forward-side channel block 162 (see FIG. 13), and the backward-side cover unit 152 is provided and interposed between the backward-side wall unit 141c and the backward-side channel block 163 (see FIG. 13).

The forward-side cover unit 151 includes a forward-side covering unit 151a which covers the outer surface of the forward-side wall unit 141b and a fin-shaped unit 151b extended from the forward-side covering unit 151a to the longitudinal direction of the blade rubber 120 and formed in a shape similar to that of the fin unit 132 of the holder member 130.

Also, the backward-side cover unit 152 includes a backward-side covering unit 152a which covers the outer surface of the backward-side wall unit 141c and a holder-main-body-shaped unit 152b extended from the backward-side covering unit 152a to the longitudinal direction of the blade rubber 120 and formed in a shape similar to that of the holder main body unit 131 of the holder member 130.

In this manner, by forming the shape of the cover member 150 similar to the shape of the holder member 130, aerodynamic resistance of a portion where the cover member 150 is provided and aerodynamic resistance of a portion where the cover member 150 is not provided have a substantially same value. With this, wiping-out performance of the blade rubber 120 is made favorable while the appearance of the wiper blade 110 is enhanced.

As shown in FIGS. 9 to 15 and 17, the washer apparatus 160 is provided to an intermediate portion of the holder member 130 in the longitudinal direction. Here, in FIGS. 12 to 15, the washer apparatus 160 is shaded for ease of understanding of the structure of the washer apparatus 160.

The washer apparatus 160 includes a forward-side washer mechanism 161a and a backward-side washer mechanism 161b so as to interpose the coupling main body 141. The forward-side washer mechanism 161a and the backward-side washer mechanism 161b are each fixed to the coupling main body 141, and are disposed to face each other so as to have a mirror image relation centering at the blade rubber 120.

As shown in FIGS. 14 and 15, the washer mechanisms 161a and 161b forming the washer apparatus 160 are provided in ranges of projected areas of the forward-side cover unit 151 and the backward-side cover unit 152 in the cover member 150 in a plan view from the direction crossing the longitudinal direction of the blade rubber 120, that is, broken lines (1) and (2) shown in FIGS. 14 and 15, respectively.

In this manner, by providing the washer apparatus 160 in the range of the projected area of the cover member 150, disturbance in travelling wind (not shown) flowing from the backward side of the wiper blade, for example, the front side of the vehicle, is inhibited to prevent a decrease in wiping-out performance of the blade rubber 120.

The forward-side washer mechanism 161a and the backward-side washer mechanism 161b respectively include a forward-side channel block 162 and a backward-side channel block 163, which are different in shape from each other. Each of the forward-side channel block 162 and the backward-side channel block 163 is formed of resin material such as plastic, and formed into a stepped box shape.

Here, the forward-side channel block 162 has a length dimension along the longitudinal direction of the blade rubber 120 longer than that of the backward-side channel block 163. This is because the projected area of the forward-side cover unit 151 (see the broken line (1) of FIG. 14) is larger than the projected area of the backward-side cover unit 152 (see the broken line (2) of FIG. 15).

The forward-side channel block 162 is provided on a forward side of the blade rubber 120, and includes an inner-peripheral-side wall 162a, an outer-peripheral-side wall 162b, a rear-side wall 162c, a front-side wall 162d, a forward-side wall 162e, and a coupling-main-body-side wall 162f. Here, the inner-peripheral-side wall 162a and the outer-peripheral-side wall 162b are disposed to face each other, the rear-side wall 162c and the front-side wall 162d are disposed to face each other, and the forward-side wall 162e, and the coupling-main-body-side wall 162f are disposed to face each other. Of these walls, the front-side wall 162d is formed into a three-step shape as shown in FIG. 10.

To the coupling-main-body-side wall 162f of the forward-side channel block 162, the positioning claw 162g and the retaining claw 162h are integrally provided so as to protrude toward a coupling main body 141. The positioning claw 162g and retaining claw 162h form a fixing claw in the present invention, and both are fixed to the forward-side wall unit 141b by being inserted into the forward-side attachment hole 141e to be hooked on the forward-side wall unit 141b. In addition, although the positioning claw 162g and the retaining claw 162h are not shown in detail, they are formed in shapes similar to those of the positioning claw 163g and the retaining claw 163h of the backward-side channel block 163, respectively, which will be described further below.

The backward-side channel block 163 is provided on a backward side of the blade rubber 120, and includes an inner-peripheral-side wall 163a, an outer-peripheral-side wall 163b, a rear-side wall 163c, a front-side wall 163d, a backward-side wall 163e, and a coupling-main-body-side wall 163f. Here, the inner-peripheral-side wall 163a and the outer-peripheral-side wall 163b are disposed to face each other, the rear-side wall 163c and the front-side wall 163d are disposed to face each other, and the backward-side wall 163e and the coupling-main-body-side wall 163f are disposed to face each other. Of these walls, the front-side wall 163d is formed stepwise with two steps as shown in FIG. 10.

To the coupling-main-body-side wall 163f of the backward-side channel block 163, the positioning claw 163g and the retaining claw 163h are integrally provided so as to protrude toward a coupling main body 141. These positioning claw 163g and retaining claw 163h form a fixing claw in the present invention, and both are fixed to the backward-side wall unit 141c by being inserted into the backward-side attachment hole 141f to be hooked on the backward-side wall unit 141c.

To fix the forward-side channel block 162 and the backward-side channel block 163 to the coupling main body 141, as shown in FIG. 13, the positioning claws 162g and 163g are first diagonally inserted into the forward-side attachment hole 141e and the backward-side attachment hole 141f, respectively, to be hooked. With this, the forward-side channel block 162 and the backward-side channel block 163 are positioned with respect to the forward-side wall unit 141b and the backward-side wall unit 141c, respectively. That is, the positioning claws 162g and 163g position the coupling member 140 of the washer apparatus 160.

Then, the retaining claws 162h and 163h are inserted into the forward-side attachment hole 141e and the backward-side attachment hole 141f, respectively, from the direction crossing the longitudinal direction of the blade rubber 120 to be hooked. With this, the forward-side channel block 162 and the backward-side channel block 163 are retained with respect to the forward-side wall unit 141b and the backward-side wall unit 141c, respectively, thereby completing fixation of the forward-side channel block 162 and the backward-side channel block 163 to the coupling main body 141. That is, the retaining claws 162h and 163h prevent the washer apparatus 160 from being detached from the coupling member 140.

In this manner, without using fixing means such as adhesive, strong fixation with a single touch can be achieved by the attachment holes 141e and 141f, the positioning claws 162g and 163g, and the retaining claws 162h and 163h. With this, an improvement in productivity and a reduction in manufacturing cost can be achieved.

Here, in FIGS. 12 and 13, the hook attachment member 143 and the cover member 150 (see FIG. 10) are omitted for ease of understanding the fixing structure of the forward-side channel block 162 and the backward-side channel block 163 to the coupling main body 141.

In addition, note that the forward-side channel block 162 and the backward-side channel block 163 are each fixed to the coupling main body 141 after the cover member 150 is attached to the coupling main body 141. That is, the washer apparatus 160 is fixed to the coupling member 140 via the cover member 150. In this manner, the cover member 150 is strongly fixed to the coupling member 140 together with the washer apparatus 160 without rattling. Therefore, the cover member 150, which hides the coupling member 140 and enhances the appearance, is strongly fixed to the coupling member 140 together with the washer apparatus 160, thereby achieving both of an improvement in assembling process of the wiper blade 110 and construction of the components forming the wiper blade 110 without rattling.

The rear-side wall 162c of the forward-side channel block 162 is provided with a plurality of forward-side injection nozzles A, B, and C facing the front glass 112 as shown in FIG. 11. In the second embodiment, three forward-side injection nozzles A, B, and C are provided. These forward-side injection nozzles A, B, and C are disposed so as to be aligned substantially equidistantly along the longitudinal direction of the blade rubber 120. Each of the forward-side injection nozzles A, B, and C is formed in a substantially spherical shape as shown in FIG. 17 so as to adjust an injecting direction of washer liquid "W" (see FIG. 11).

Each of the forward-side injection nozzles A, B, and C is oriented to a forward side of the blade rubber 120. More specifically, as shown in FIG. 11, the forward-side injection nozzle A on an outer peripheral side of the rear-side wall 162c is oriented to the forward side and the outer peripheral side of the blade rubber 120. In addition, the forward-side injection nozzle B at an intermediate portion of the rear-side wall 162c in the longitudinal direction is oriented to the forward side of the blade rubber 120 and a direction (horizontal direction) orthogonal to the longitudinal direction of the blade rubber 120. Furthermore, the forward-side injection nozzle C on an inner peripheral side of the rear-side wall 162c is oriented to the forward side and the inner peripheral side of the blade rubber 120.

In this manner, by orienting the forward-side injection nozzles A, B, and C to three directions, that is, an outer peripheral side, just beside, and an inner peripheral side, respectively, on the forward side of the blade rubber 120, a nearby portion on the forward side of the blade rubber 120 can substantially uniformly get wet. Here, if diffusion-type nozzles which inject the washer liquid "W" in a mist manner are used, it is possible to wet a wider area inside the wiping-out area "AR" (see FIG. 9).

Also, by the forward-side injection nozzles A, B, and C, a wide area inside the wiping-out area "AR" is wetted with the washer liquid "W", and the length dimension of the forward-side washer mechanism 161a along the longitudinal direction of the blade rubber 120 is shortened. Therefore, the channel through which the washer liquid "W" passes before injected can be shortened and, in turn, power consumption of the washer pump (not shown) can be reduced while the washer liquid "W" is inhibited from being frozen.

The rear-side wall 163c of the backward-side channel block 163 is provided with a plurality of backward-side injection nozzles D and E facing the front glass 120 as shown in FIG. 11. In the second embodiment, two backward-side injection nozzles D and E are provided. These backward-side injection nozzles D and E are disposed so as to be aligned along the longitudinal direction of the blade rubber 120 at a distance substantially equal to that of the forward-side injection nozzles A, B, and C.

Here, one backward-side injection nozzle D is disposed between the forward-side injection nozzles A and B along the longitudinal direction of the blade rubber 120, and the other backward-side nozzle E is disposed between the forward-side injection nozzles B and C along the longitudinal direction of the blade rubber 120. Also, each of the backward-side injection nozzles D and E is formed in a substantially spherical shape similar to that of each of the forward-side injection nozzles A, B and C so as to adjust an injecting direction of washer liquid "W" (see FIG. 11).

Each of the backward-side injection nozzles D and E is oriented to a backward side of the blade rubber 120. More specifically, as shown in FIG. 11, the backward-side injection nozzle D on an outer peripheral side of the rear-side wall 163c is oriented to the backward side and the outer peripheral side of the blade rubber 120. On the other hand, the backward-side injection nozzle E on an inner peripheral side of the rear-side wall 163c is oriented to the backward side and the inner peripheral side of the blade rubber 120.

In this manner, by orienting the backward-side injection nozzles D and E to two directions, that is, an outer peripheral side and an inner peripheral side, respectively, on the backward side of the blade rubber 120, a nearby portion on the backward side of the blade rubber 120 can substantially uniformly get wet. Here, if diffusion-type nozzles which inject the washer liquid "W" in a mist manner are also used as the backward-side injection nozzles D and E, it is possible to wet a wider area inside the wiping-out area "AR".

Also, as with the forward-side washer mechanism 161a, the length dimension of the backward-side washer mechanism 161b along the longitudinal direction of the blade rubber 120 is shortened. Therefore, also in the backward-side washer mechanism 161b, the channel through which the washer liquid "W" passes before injected can be shortened and, in turn, power consumption of the washer pump can be reduced while the washer liquid "W" is inhibited from being frozen.

Here, although not shown in detail, the injection positions of the washer liquid "W" injected from the forward-side injection nozzles A, B, and C and the injection positions of the backward-side injection nozzles D and E are alternately disposed along the longitudinal direction of the blade rubber 120. Therefore, in wiping-out motion of the blade rubber 120 for one reciprocation with injection of washer liquid, the front glass 112 can uniformly get wet. With this, in wiping-out motion of the blade rubber 120 for one reciprocation with injection of the washer liquid "W", a wide area on the front glass 112 can be cleanly washed.

To the inner-peripheral-side wall 162a of the forward-side channel block 162 and the inner-peripheral-side wall 163a of the backward-side channel block 163, a forward-side tube insertion unit 162i and a backward-side tube insertion unit 163i are integrally provided, respectively, as shown in FIGS. 10 and 11. To each of the forward-side tube insertion unit 162f and the backward-side tube insertion unit 163f, one end side of a rubber tube "TB" shown in FIG. 12 is inserted.

Here, to the other end side of the rubber tube "TB", the washer pump installed inside the engine room of the vehicle is connected. Also, the rubber tubes "TB" are arranged on the inner peripheral side along the longitudinal direction of the blade rubber 120, thereby making the other end side of the rubber tube "TB" easily introduced into the engine room.

Then, by operating a washer switch, the washer pump is driven. Then, as two-dot-chain lines with arrows in FIGS. 9 and 10, the washer liquid "W" is supplied via the rubber tubes "TB" to the inside of the forward-side channel block 162 and the backward-side channel block 163. Here, by switching driving of the washer pump, the washer liquid "W" is supplied only to the forward-side channel block 162 at the time of forward-side wiping-out motion of the wiper blade 110, and the washer liquid "W" is supplied only to the backward-side channel block 163 at the time of backward-side wiping-out motion of the wiper blade 110.

As described in detail above, according to the wiper blade 110 of the second embodiment, by the attachment holes 141*e* and 141*f*, the positioning claws 162*g* and 163*g*, and the retaining claws 162*h* and 163*h*, the washer apparatus 160 is fixed to the coupling member 140 having stiffness higher than that of the holder member 130 and to which the wiper arm 111 is coupled. The stiffness of the coupling member 140 is high (made of a steel plate) because the wiper arm 111 is coupled. Therefore, the washer apparatus 160 can be strongly fixed to the coupling member 140. Thus, the injection position of the washer liquid "W" can be stabilized.

The present invention is not restricted to the above-described second embodiment, and it goes without saying that the present invention can be variously modified in a range not deviating from the gist of the present invention. For example, while the wiper blade 110 wipes out the front glass 112 as a windshield in the above-described second embodiment, the present invention is not restricted to this, and the present invention can be applied as wiping out a rear glass as a windshield.

Also, in the second embodiment, three forward-side injection nozzles are provided, two backward-side injection nozzles are provided, and the washer liquid "W" as minimum as required is injected by these five injection nozzles in total, thereby reducing the consumption amount of the washer liquid "W". However, the present invention is not restricted to this construction. For example, the number of forward-side injection nozzles and the number of backward-side injection nozzles may be equal to each other, or the number of backward-side injection nozzles may be larger than the number of forward-side injection nozzles.

Furthermore, in the above-described second embodiment, the forward-side injection nozzles A, B, and C are provided on the rear-side wall 162*c*, and the backward-side injection nozzles D and E are provided on the rear-side wall 163*c*. However, the present invention is not restricted to this. For example, the forward-side injection nozzles A, B, and C may be provided on the forward-side wall 162*e*, and the backward-side injection nozzles D and E may be provided on the backward-side wall 163*e*.

Hereinafter, the third embodiment of the present invention will be described in detail with reference to the accompanying drawings.

Figure 18:
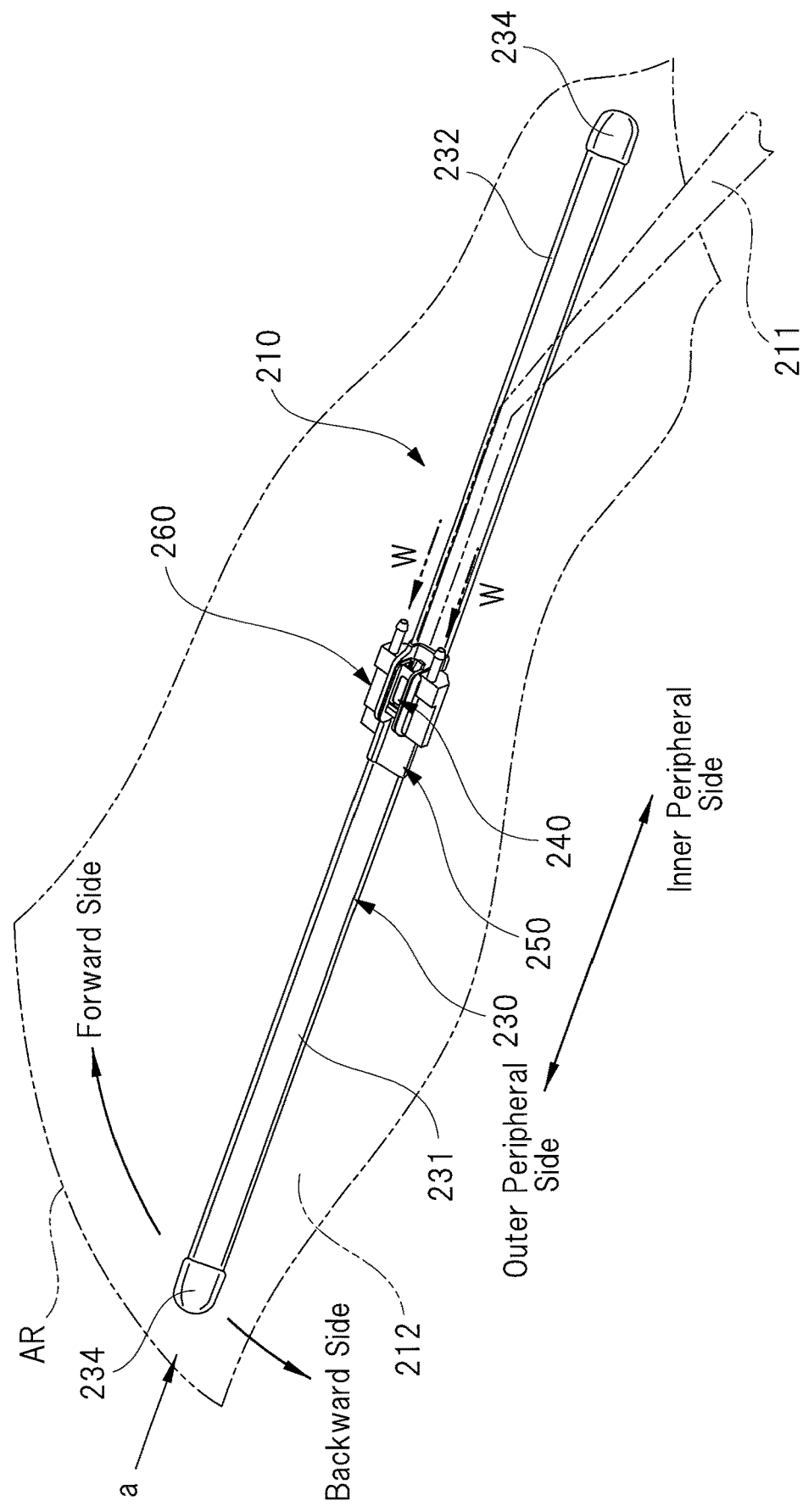
FIG. 18 is a perspective view showing an entire wiper blade of a third embodiment.
Figure 19:
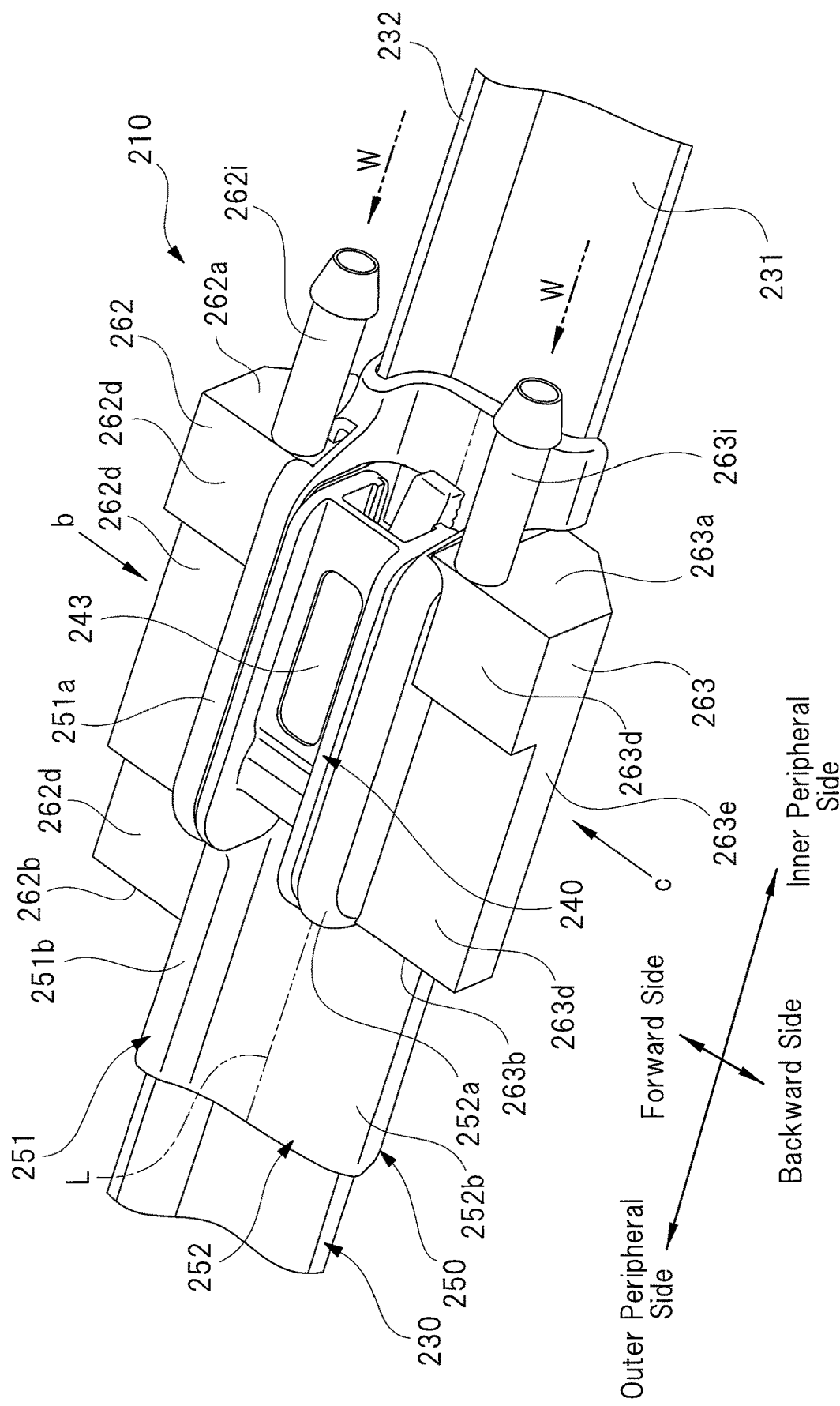
FIG. 19 is an enlarged perspective view of the periphery of a coupling member of the wiper blade of FIG. 18 when viewed from a front side.
Figure 20:
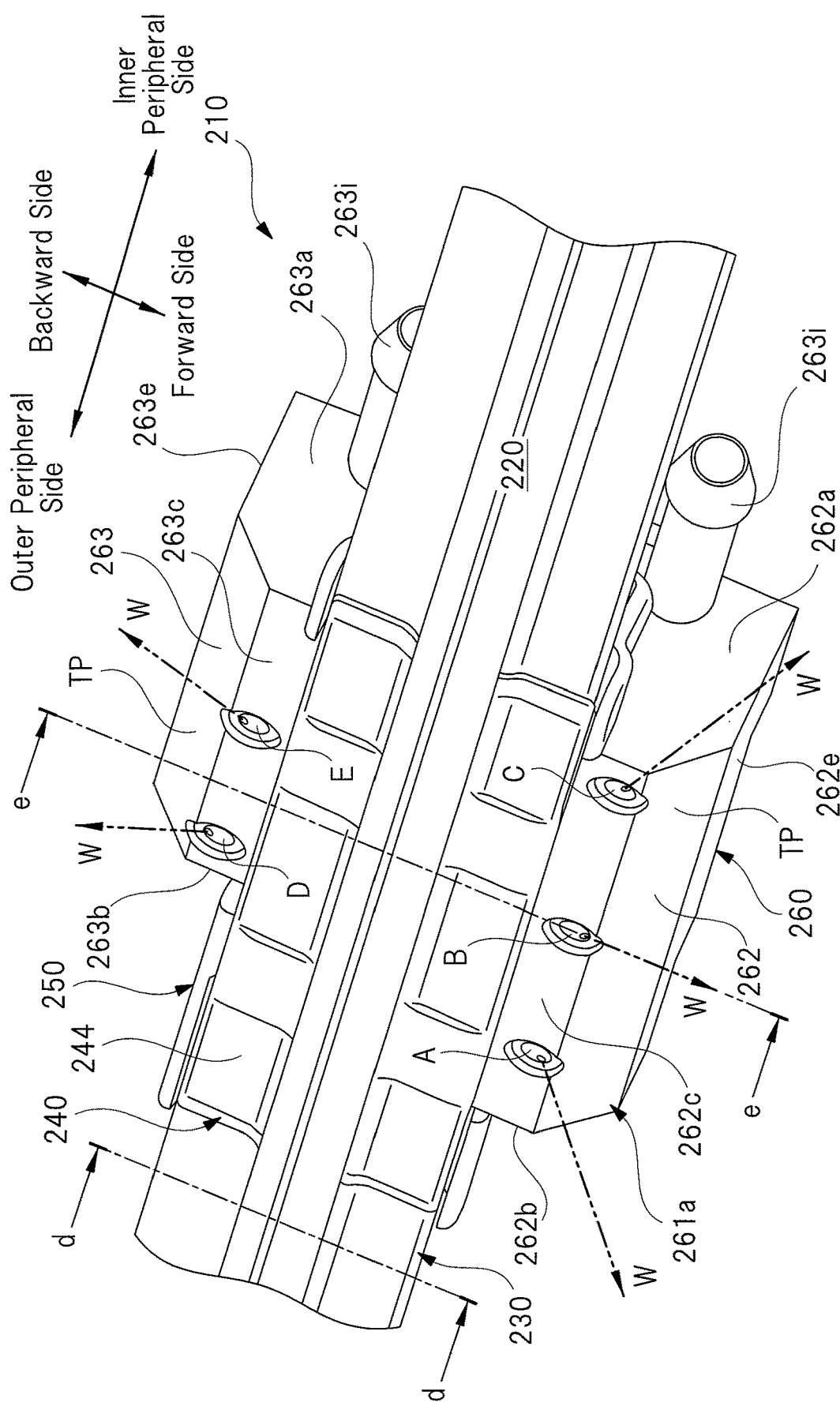
FIG. 20 is an enlarged perspective view of the periphery of the coupling member of the wiper blade of FIG. 18 when viewed from a rear side.
Figure 21:
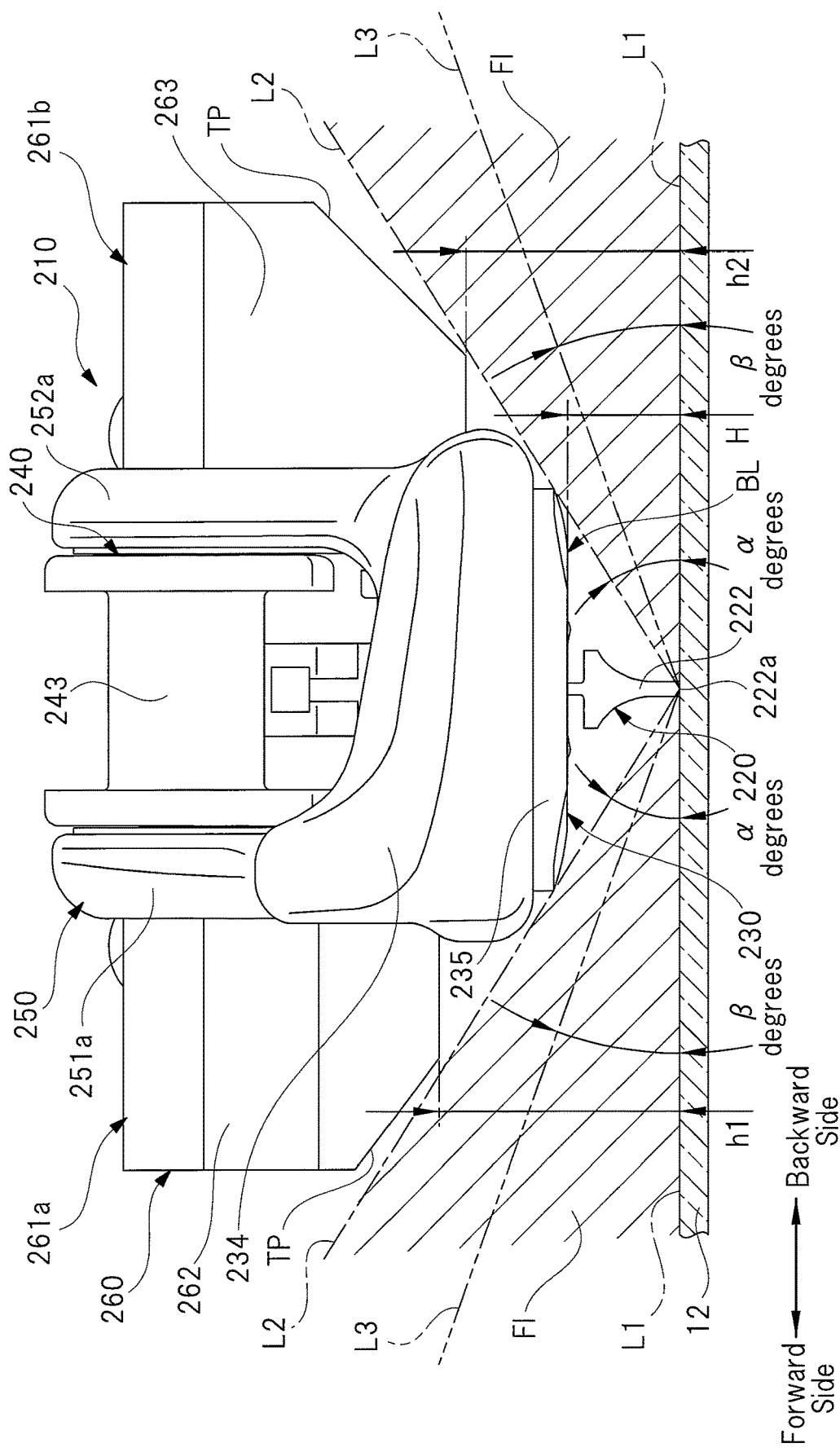
FIG. 21 is a diagram viewed from an arrow "a" of FIG. 18.
Figure 22:
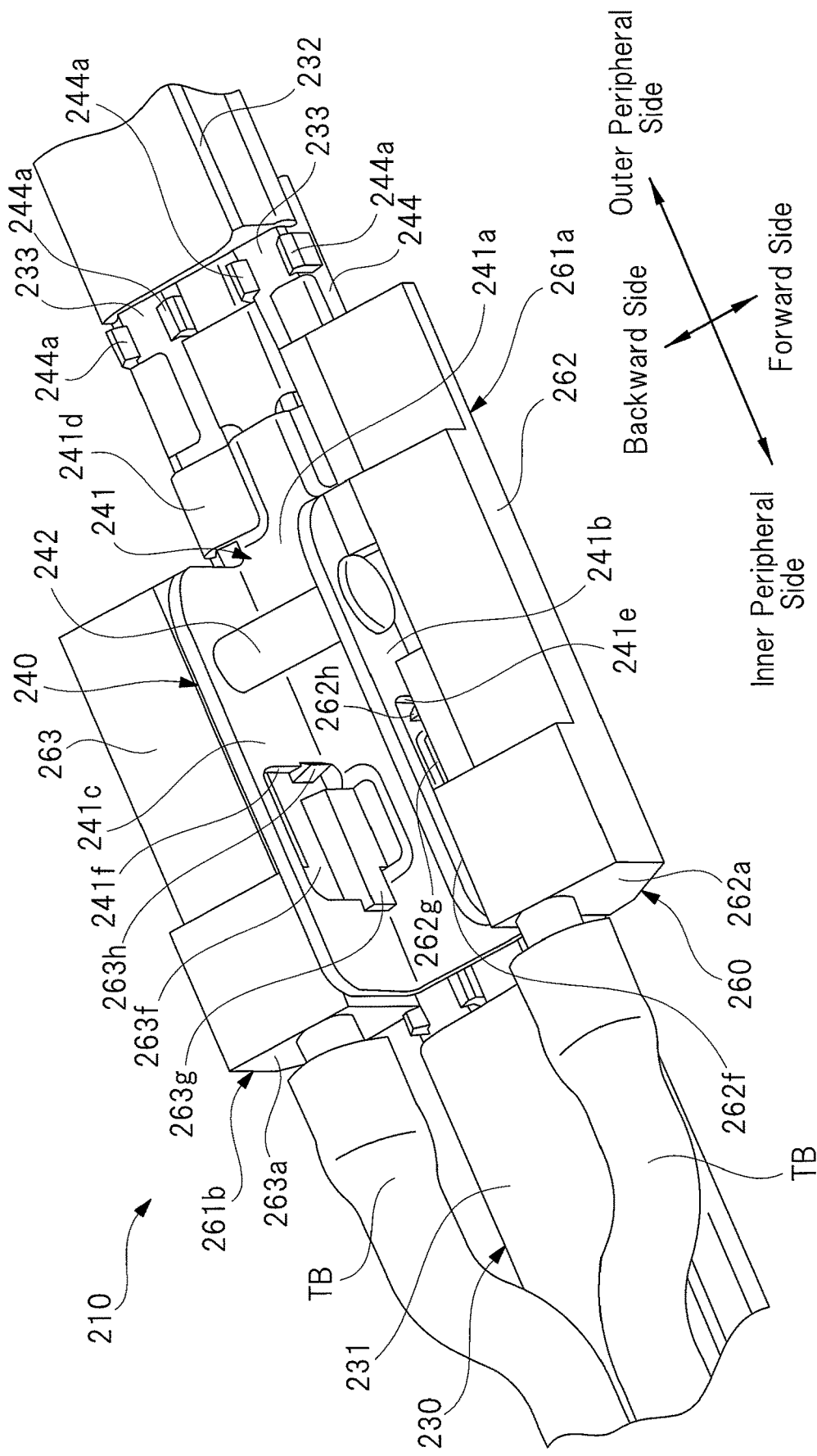
FIG. 22 is an enlarged perspective view for describing a fixing structure of the coupling member and a washer apparatus.
Figure 23:
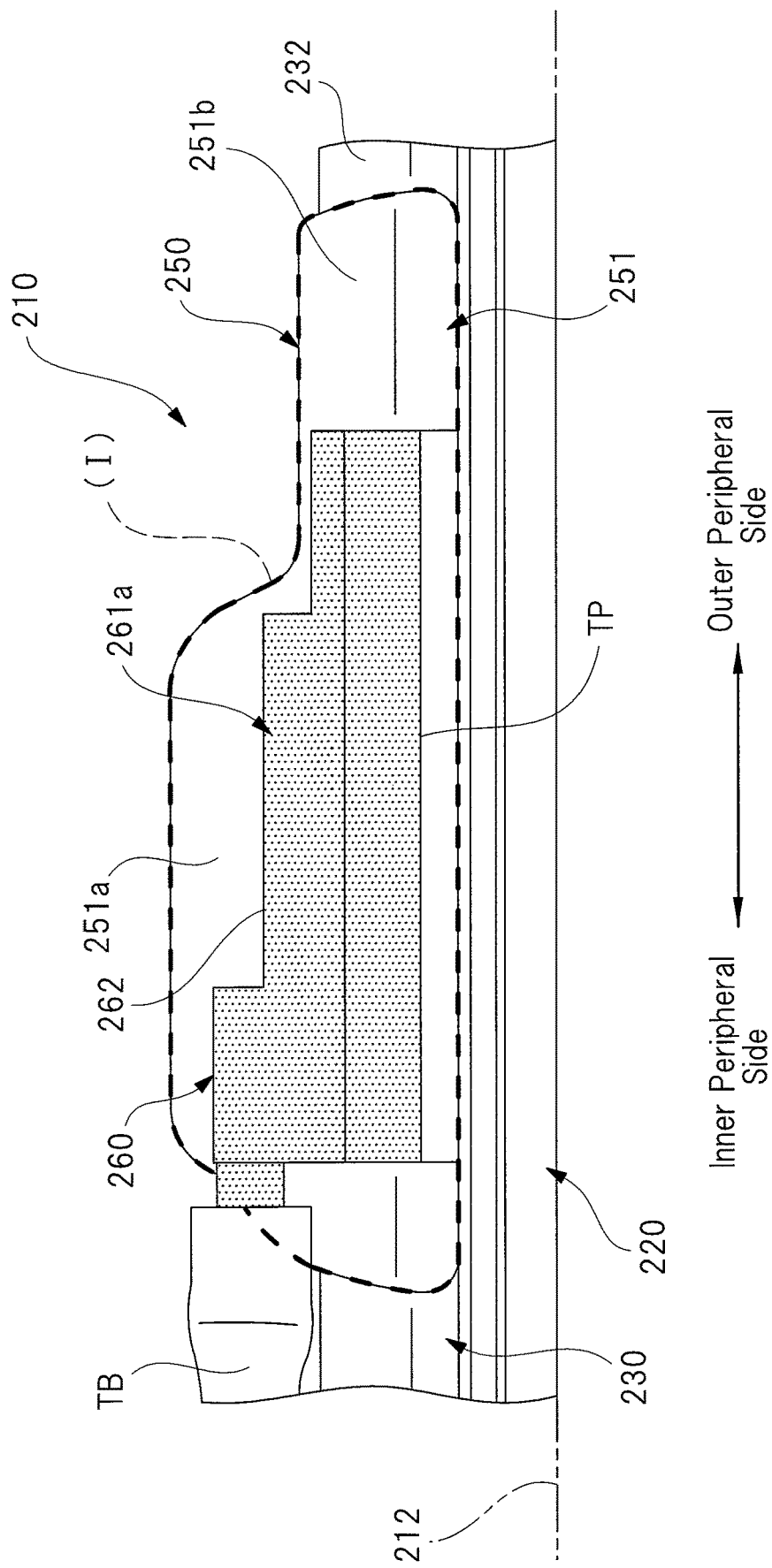
FIG. 23 is a diagram viewed from an arrow "b" of FIG. 19.
Figure 24:
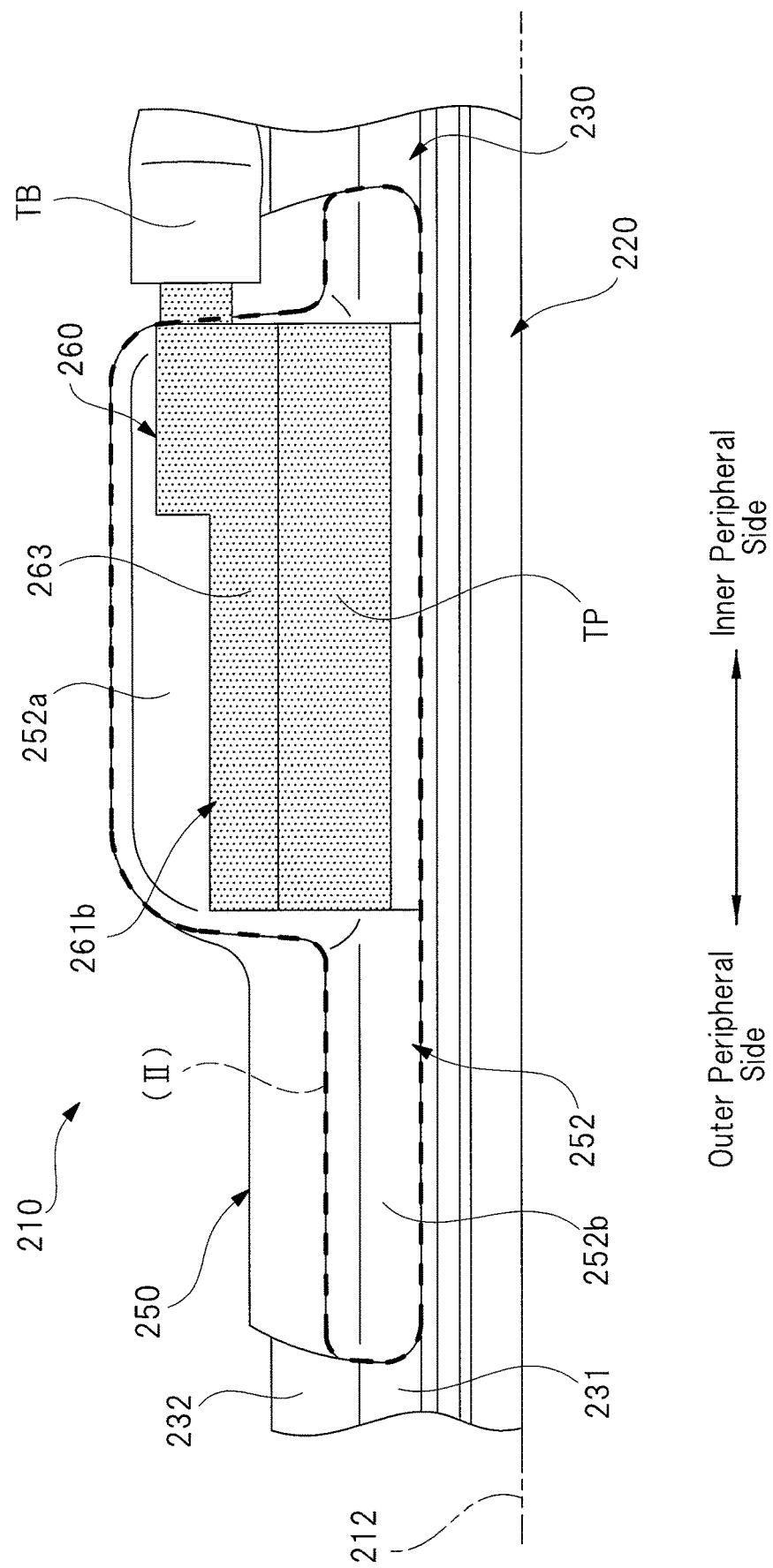
FIG. 24 is a diagram viewed from an arrow "c" of FIG. 19.
Figure 25:
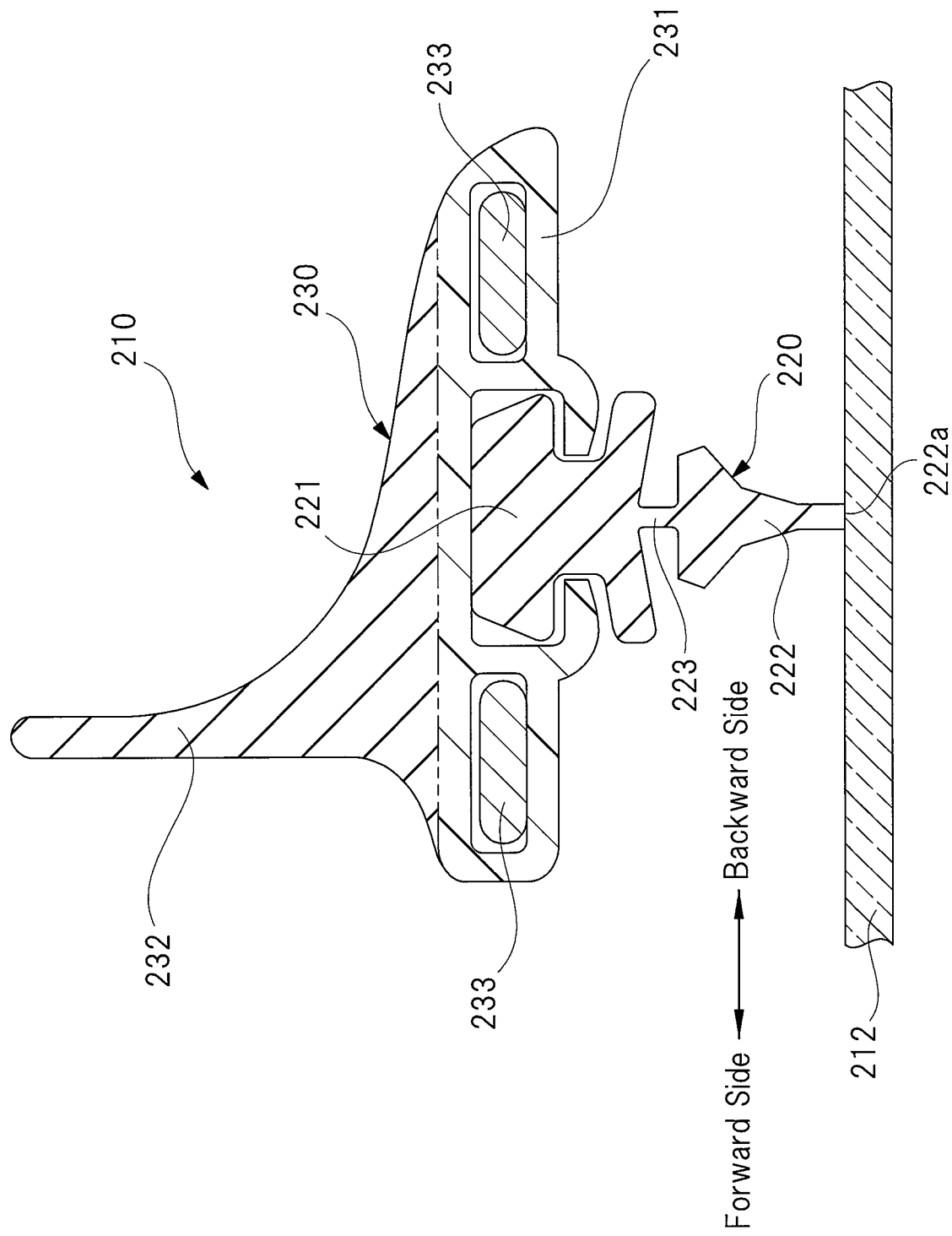
FIG. 25 is a sectional view along a d-d line of FIG. 20.
Figure 26:
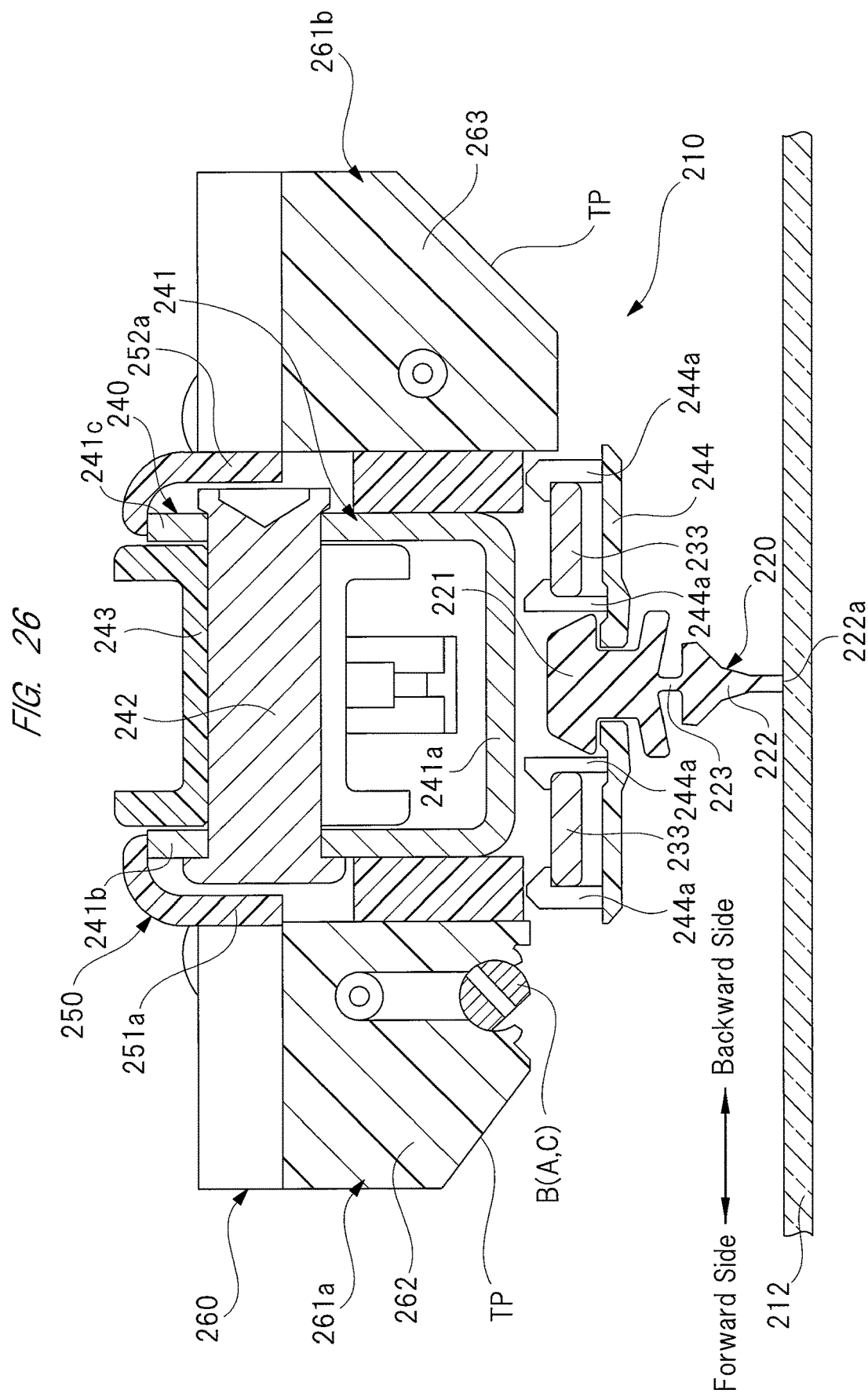
FIG. 26 is a sectional view along an e-e line of FIG. 20.
Figure 27A:
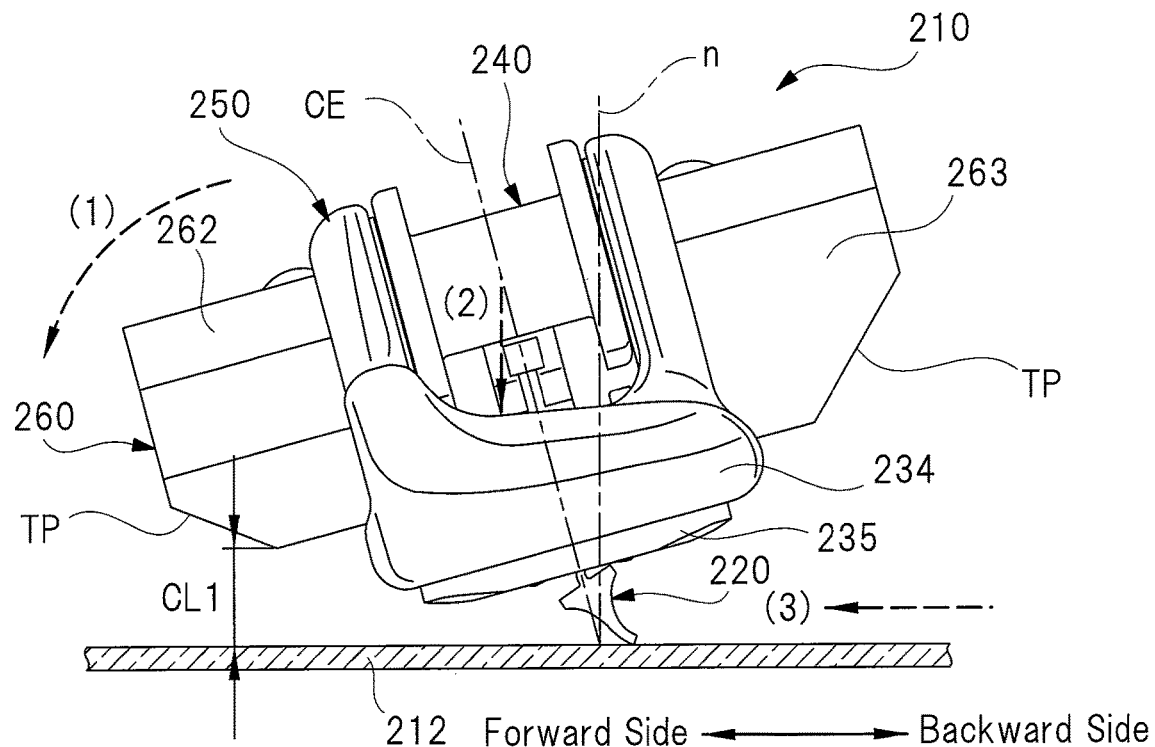
FIGS. 27A and 27B are diagrams explaining a tilted state of the wiper blade in a wiping-out direction.
Figure 27B:
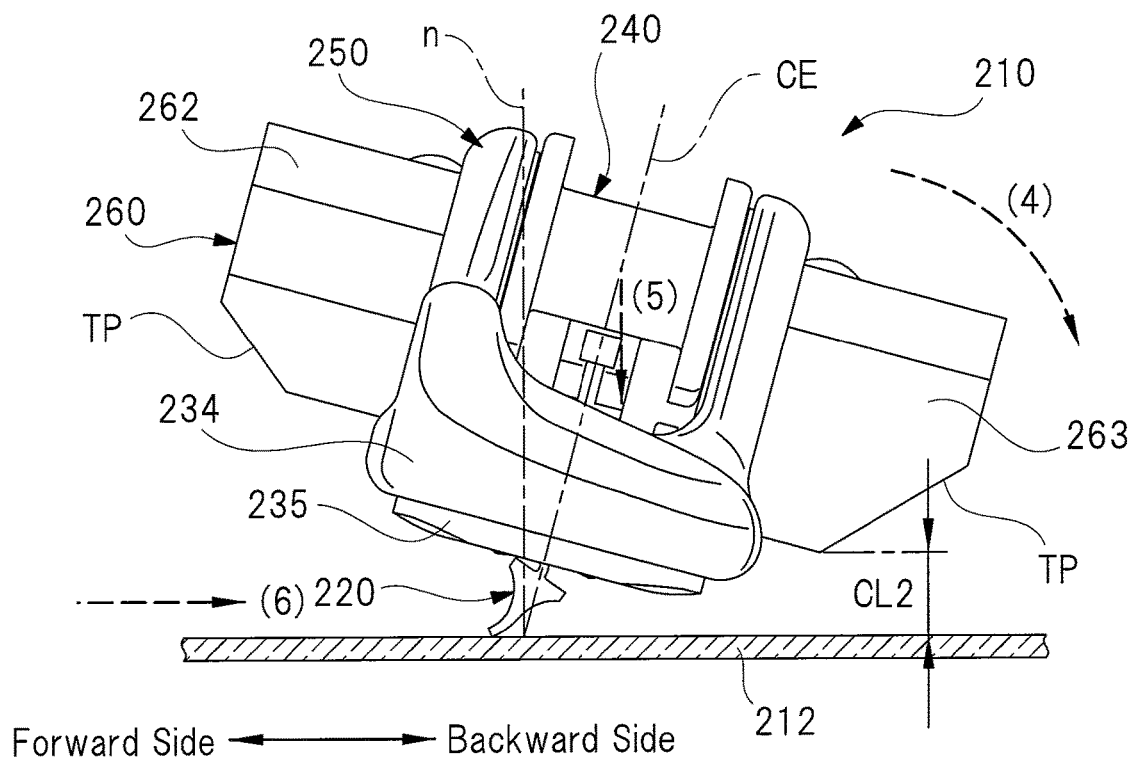

FIG. 18 is a perspective view showing an entire wiper blade of a third embodiment, FIG. 19 is an enlarged perspective view of the periphery of a coupling member of the wiper blade of FIG. 18 when viewed from a front side, FIG. 20 is an enlarged perspective view of the periphery of the coupling member of the wiper blade of FIG. 18 when viewed from a rear side, FIG. 21 is a diagram viewed from an arrow "a" of FIG. 18, FIG. 22 is an enlarged perspective view for describing a fixing structure of the coupling member and a washer apparatus, FIG. 23 is a diagram viewed from an arrow "b" of FIG. 19, FIG. 24 is a diagram viewed from an arrow "c" of FIG. 19, FIG. 25 is a sectional view along a d-d line of FIG. 20, FIG. 26 is a sectional view along an e-e line of FIG. 20, and FIGS. 27A and 27B are diagrams explaining a tilted state of the wiper blade in a wiping-out direction.

As shown in FIG. 18, a wiper blade 210 is rotatably attached to a tip portion of a wiper arm 211 provided on a front side (not shown) of a vehicle such as automotive vehicle. With ON operation on a wiper switch (not shown) provided inside a cabin, the wiper arm 211 is driven for swinging with rotational driving of a wiper motor (not shown). This causes the wiper blade 210 to make reciprocating wiping-out motion in a predetermined wiping range "AR" formed on a front glass (windshield) 212 toward a forward side and a backward side as indicated by arrows in the drawing.

As shown in FIGS. 18 to 27, the wiper blade 210 includes: a blade rubber 220 in contact with the front glass 212; a holder member 230 which holds the blade rubber 220; a coupling member 240 provided to an intermediate portion of the holder member 230 in a longitudinal direction; and a cover member 250 covering the coupling member 240, and a washer apparatus 260 fixed to the coupling member 240.

As shown in FIGS. 25 and 26, the blade rubber 220 includes: a main body portion 221 held by the holder member 230; a lip portion 222 in contact with the front glass 212; and a neck portion 223 which couples the main body portion 221 and the lip portion 222 to each other. In addition, note that the blade rubber 220 is formed so as to be long by extrusion molding of an elastic material such as rubber and has a sectional shape that is uniform over an entire region in the longitudinal direction.

At the tip portion of the lip unit 222, that is, on a front glass side 212 of the lip unit 222, a flat-shaped contact unit 222*a* in contact with the front glass 212 is provided. An entire surface of this contact unit 222*a* makes contact with the front glass 212, as shown in FIGS. 21, 25, and 26, when the wiper blade 210 is not tilted with respect to the front surface (wiping-out surface) of the front glass 212 but in a vertical state.

The neck portion 223 has a thickness in a motion direction (lateral direction in the drawing) of the blade rubber 220 set to be thinner than that of the main body portion 221 and the lip portion 222, and therefore easily elastically deformable. Thus, when the wiper blade 210 moves to the forward side and the backward side on the front glass 212, the lip portion 222 is allowed to be tilted, and in turn, the tip portion of the lip portion 222 can smoothly follow in a moving direction of the wiper blade 210 (see FIG. 27). Therefore, extraneous matter (not shown) such as rain water and dirt on the front glass 212 can be reliably wiped out.

As shown in FIGS. 18, 19, and 25, the holder member 230 includes a holder main body 231 and a fin portion 232. The holder main body 231 and the fin portion 232 are integrated by two-color molding of materials different in hardness from each other, and they are long, and similarly in length to the blade rubber 220.

The holder main body 231 is formed of resin material such as flexible plastic, and can follow a curved surface (not shown) of the front glass 212 while having a strength sufficient to hold the main body portion 221 of the blade rubber 220. On the other hand, the fin portion 232 is formed of elastic material such as rubber, and lower in hardness than the holder main body 231. With traveling wind hitting the fin portion 232, a downforce is applied to the wiper blade 210, thereby favorably holding the wiping-out performance of the blade rubber 220.

As shown in FIG. 25, paired vertebrae 233 are provided inside the holder main body 231 and spaced apart from each other at a predetermined distance. The vertebrae 233 are each formed of steel plate with spring properties, and are disposed so as to interpose the main body portion 221 of the blade rubber 220 from the forward side and the backward side to have a mirror image relation. In a natural state in which no external force is applied, each vertebra 233 is curved with a curvature larger than the curvature of the front glass 212, and causes the holder member 230 and the blade rubber 220 to be elastically deformed in accordance the curvature of the front glass 212. With this construction, the entire region of the lip portion 222 in the longitudinal direction is brought into intimate contact with the front glass 212.

As shown in FIGS. 18 and 21, paired end caps 234 are attached to both ends of the holder member 230 in the longitudinal direction. With this, the blade rubber 220 held by the holder member 230 is prevented from coming off. On the same side of each end cap 234 as the blade rubber 220, as shown in FIG. 21, a spacer member 235 (only one is shown in the drawing) is attached. A side surface (front side in the drawing) of the spacer member 235 is formed in a gentle arc shape, thereby smoothly relieving travelling wind flowing from a front side (right side in the drawing) of the blade rubber 220 to a rear side of the blade rubber 220 (left side in the drawing). Thus, it is possible to inhibit the occurrence of a so-called water draining phenomenon, in which the washer liquid "W" (see FIG. 20) is convoluted to a rear side at both end in the longitudinal direction of the blade rubber 220, and eliminate an unwiped portion (wiping unevenness).

Here, the holder member 230 is composed of the holder main body 231, the fin part 232, each vertebra 233, the end caps 234, and the spacer member 235. The spacer member 235 forming the holder member 230 is disposed to a portion of the holder member 230 closest to the front glass 212, thereby forming a boundary part in the present invention. More specifically, as shown in FIG. 21, when the wiper blade 210 is viewed in a plane perpendicular to the longitudinal direction of the blade rubber 220, a boundary part BL is formed between the spacer member 235 and the blade rubber 220. The position of this boundary part BL from the front glass 212 is set at a height dimension "H". The height dimension "H" of this boundary part BL is lower than height dimensions "h1" and "h2" of the washer apparatus 260 (the forward-side channel block 262 and the backward-side channel block 263), which will be described further below (H<h2<h1).

As shown in FIGS. 18 to 22, 26, and 27, the coupling member 240 is provided to an intermediate portion in the longitudinal direction of the holder member 230 and at a portion near a coupling unit between the holder member 230 and the wiper arm 211. This coupling member 240 is composed of a coupling main body 241, a columnar pin 242, a hook attachment member 243, and a base plate 244.

The coupling main body 241 has a section formed in a substantially "U" shape by pressing working of a steel plate. The coupling main body 241 includes a bottom wall unit 241a, and a forward-side wall unit 241b and a backward-side wall unit 241c each integrally provided to the bottom wall unit 241a and disposed to face each other. To the bottom wall unit 241a, a plurality of fixing leg units 241d (only one is shown in FIG. 22) are integrally provided. With these fixing leg units 241d swaged and fixed to each vertebra 233, the coupling main body 241 is strongly fixed to each vertebra 233. Here, the coupling main body 241 includes a function of holding the respective vertebrae 233 with predetermined spacing.

Between the forward-side wall unit 241b and the backward-side wall unit 241c, the columnar pin 242 made of steel material is swaged and fixed. To the columnar pin 242, the hook attachment member 243 formed of resin material such as plastic into a predetermined shape is rotatably attached. Here, to the hook attachment member 243, a U-shaped hook (not shown) formed at the tip portion of the wiper arm 211 is coupled with a single touch. That is, the wiper arm 211 is coupled to the coupling member 240.

The forward-side wall unit 241b and the backward-side wall unit 241c are provided with a forward-side attachment hole 241e and a backward-side attachment hole 241f, respectively, which are open in a direction crossing (orthogonal to) the longitudinal direction of the blade rubber 220. The forward-side attachment hole 241e and the backward-side attachment hole 241f are each formed in a substantially rectangular shape, and face each other from the direction orthogonal to the longitudinal direction of the blade rubber 220. To the forward-side attachment hole 241e and the backward-side attachment hole 241f, positioning claws 262g and 263g and retaining claws 262h and 263h of the forward-side channel block 262 and the backward-side channel block 263, respectively, are inserted and fixed.

The base plate 244 is formed of resin material such as plastic in a plate shape as shown in FIG. 26. To this base plate 244, a plurality of fixing leg units 244a are integrally provided. Each fixing leg unit 244a of the base plate 244 is attached to each vertebra 233. With this, the base plate 244 is fixed to each vertebra 233. Here, the coupling main body 241 is disposed on the same side of the holder member 230 as a fin unit 232 (front side), and the base plate is disposed on the same side of the holder member 230 as a holder main body 231 (rear side).

As shown in FIGS. 19, 23, and 24, the cover member 250 is formed of resin material such as plastic in a substantially box shape, and attached to the coupling main body 241 by a plurality of integrally-provided engaging claws (not shown). This cover member 250 is provided so as to cover the coupling main body 241 forming part of the coupling member 240, thereby enhancing the appearance of the wiper blade 210.

The cover member 250 includes a forward-side cover unit 251 and a backward-side cover unit 252. The forward-side cover unit 251 and the backward-side cover unit 252 are integrated on an imaginary line "L" shown in FIG. 19 as a boundary. The forward-side cover unit 251 is provided and interposed between the forward-side wall unit 241b and the forward-side channel block 262 (see FIG. 22), and the backward-side cover unit 252 is provided and interposed between the backward-side wall unit 241c and the backward-side channel block 263 (see FIG. 22).

The forward-side cover unit 251 includes a forward-side covering unit 251a which covers the outer surface of the forward-side wall unit 241b and a fin-shaped unit 251b extended from the forward-side covering unit 251a to the longitudinal direction of the blade rubber 220 and formed in a shape similar to that of the fin unit 232 of the holder member 230.

Also, the backward-side cover unit 252 includes a backward-side covering unit 252a which covers the outer surface of the backward-side wall unit 241c and a holder-main-body-shaped unit 252b extended from the backward-side covering unit 252a to the longitudinal direction of the blade rubber 220 and formed in a shape similar to that of the holder main body unit 231 of the holder member 230.

In this manner, by forming the shape of the cover member 250 similar to the shape of the holder member 230, aerodynamic resistance of a portion where the cover member 250 is provided and aerodynamic resistance of a portion where the cover member 250 is not provided have a substantially same value. With this, wiping-out performance of the blade rubber 220 is made favorable while the appearance of the wiper blade 210 is enhanced.

As shown in FIGS. 18 to 24, 26, and 27, the washer apparatus 260 is provided to an intermediate portion of the holder member 230 in the longitudinal direction in the vicinity of a coupling portion between the holder member 230 and the wiper arm 211. Here, in FIGS. 23 and 24, the washer apparatus 260 is shaded for ease of understanding of the structure of the washer apparatus 260.

The washer apparatus 260 includes a forward-side washer mechanism 261a and a backward-side washer mechanism 261b so as to interpose the coupling main body 241. The forward-side washer mechanism 261a and the backward-side washer mechanism 261b are each fixed to the coupling main body 241, and are disposed to face each other so as to have a mirror image relation centering at the blade rubber 220.

As shown in FIGS. 23 and 24, the washer mechanisms 261a and 261b forming the washer apparatus 260 are provided in ranges of projected areas of the forward-side cover unit 251 and the backward-side cover unit 252 in the cover member 250 in a plan view from the direction crossing the longitudinal direction of the blade rubber 220, that is, broken lines (I) and (II) shown in FIGS. 23 and 24, respectively.

In this manner, by providing the washer apparatus 260 in the range of the projected area of the cover member 250, disturbance in travelling wind (not shown) flowing from the backward side of the wiper blade 210, for example, the front side of the vehicle, is inhibited to prevent a decrease in wiping-out performance of the blade rubber 220.

The forward-side washer mechanism 261a and the backward-side washer mechanism 261b respectively include a forward-side channel block 262 and a backward-side channel block 263, which are different in shape from each other. Each of the forward-side channel block 262 and the backward-side channel block 263 is formed of resin material such as plastic, and formed into a stepped box shape.

Here, the forward-side channel block 262 has a length dimension along the longitudinal direction of the blade rubber 220 longer than that of the backward-side channel block 263. This is because the projected area of the forward-side cover unit 251 (see the broken line (I) of FIG. 23) is larger than the projected area of the backward-side cover unit 252 (see the broken line (II) of FIG. 24).

The forward-side channel block 262 is provided on a forward side of the blade rubber 220, and includes an inner-peripheral-side wall 262a, an outer-peripheral-side wall 262b, a rear-side wall 262c, a front-side wall 262d, a forward-side wall 262e, and a coupling-main-body-side wall 262f. Here, the inner-peripheral-side wall 262a and the outer-peripheral-side wall 262b are disposed to face each other, the rear-side wall 262c and the front-side wall 262d are disposed to face each other, and the forward-side wall 262e, and the coupling-main-body-side wall 262f are disposed to face each other. Of these walls, the front-side wall 262d is formed into a three-step shape as shown in FIG. 19. In addition, a tapered surface "TP" inclined at an angle of substantially 45 degrees is between the rear-side wall 262c and the backward-side wall 262e.

Here, the rear side wall 262c of the forward-side channel block 262 forms a lower surface in the present invention. This rear side wall 262c is provided on the same side as the blade rubber 220, and extends substantially in parallel with the front glass 212. Also, the tapered surface TP of the forward-side channel block 262 forms a tilted surface in the present invention. This tapered surface TP is provided so as to be tilted upward from the rear side wall 262c as heading toward a side away from the blade rubber 220 (upper side in FIG. 21).

To the coupling-main-body-side wall 262f of the forward-side channel block 262, the positioning claw 262g and the retaining claw 262h are integrally provided so as to protrude toward a coupling main body 241. The positioning claw 262g and retaining claw 262h form a fixing claw in the present invention, and both are fixed to the forward-side wall unit 241b by being inserted into the forward-side attachment hole 241e to be hooked on the forward-side wall unit 241b. In addition, although the positioning claw 262g and the retaining claw 262h are not shown in detail, they are formed in shapes similar to those of the positioning claw 263g and the retaining claw 263h of the backward-side channel block 263, respectively, which will be described further below.

The backward-side channel block 263 is provided on a backward side of the blade rubber 220, and includes an inner-peripheral-side wall 263a, an outer-peripheral-side wall 263b, a rear-side wall 263c, a front-side wall 263d, a backward-side wall 263e, and a coupling-main-body-side wall 263f. Here, the inner-peripheral-side wall 263a and the outer-peripheral-side wall 263b are disposed to face each other, the rear-side wall 263c and the front-side wall 263d are disposed to face each other, and the backward-side wall 263e and the coupling-main-body-side wall 263f are disposed to face each other. Of these walls, the front-side wall 263d is formed stepwise with two steps as shown in FIG. 19. In addition, a tapered surface "TP" inclined at an angle of substantially 45 degrees is between the rear-side wall 263c and the backward-side wall 263e.

Here, the rear side wall 263c of the backward-side channel block 263 forms a lower surface in the present invention. This rear side wall 263c is provided on the same side as the blade rubber 220, and extends substantially in parallel with the front glass 212. Also, the tapered surface TP of the backward-side channel block 263 forms a tilted surface in the present invention. This tapered surface TP is provided so as to be tilted upward from the rear side wall 263c as heading toward a side away from the blade rubber 220 (upper side in FIG. 21).

To the coupling-main-body-side wall 263f of the backward-side channel block 263, the positioning claw 263g and the retaining claw 263h are integrally provided so as to protrude toward a coupling main body 241. These positioning claw 263g and retaining claw 263h form a fixing claw in the present invention, and both are fixed to the backward-side wall unit 241c by being inserted into the backward-side attachment hole 241f to be hooked on the backward-side wall unit 241c.

To fix the forward-side channel block 262 and the backward-side channel block 263 to the coupling main body 241, as shown in FIG. 22, the positioning claws 262g and 263g are first diagonally inserted into the forward-side attachment hole 241e and the backward-side attachment hole 241f, respectively, to be hooked. With this, the forward-side channel block 262 and the backward-side channel block 263 are positioned with respect to the forward-side wall unit 241b and the backward-side wall unit 241c, respectively. That is, the positioning claws 262g and 263g position the coupling member 240 of the washer apparatus 260.

Then, the retaining claws 262h and 263h are inserted into the forward-side attachment hole 241e and the backward-side attachment hole 241*f*, respectively, from the direction crossing the longitudinal direction of the blade rubber 220 to be hooked. With this, the forward-side channel block 262 and the backward-side channel block 263 are retained with respect to the forward-side wall unit 241*b* and the backward-side wall unit 241*c*, respectively, thereby completing fixation of the forward-side channel block 262 and the backward-side channel block 263 to the coupling main body 241. That is, the retaining claws 262*h* and 263*h* prevent the washer apparatus 260 from being detached from the coupling member 240.

In this manner, without using fixing means such as adhesive, strong fixation with a single touch can be achieved by the attachment holes 241*e* and 241*f*, the positioning claws 262*g* and 263*g*, and the retaining claws 262*h* and 263*h*. With this, an improvement in productivity and a reduction in manufacturing cost can be achieved.

Here, in FIG. 22, the hook attachment member 243 and the cover member 250 (see FIG. 19) are omitted for ease of understanding the fixing structure of the forward-side channel block 262 and the backward-side channel block 263 to the coupling main body 241.

In addition, note that the forward-side channel block 262 and the backward-side channel block 263 are each fixed to the coupling main body 241 after the cover member 250 is attached to the coupling main body 241. That is, the washer apparatus 260 is fixed to the coupling member 240 via the cover member 250. In this manner, the cover member 250 is strongly fixed to the coupling member 240 together with the washer apparatus without rattling.

The rear-side wall 262*c* of the forward-side channel block 262 is provided with a plurality of forward-side injection nozzles A, B, and C facing the front glass 212 as shown in FIG. 20. In the second embodiment, three forward-side injection nozzles A, B, and C are provided. These forward-side injection nozzles A, B, and C are disposed so as to be aligned substantially equidistantly along the longitudinal direction of the blade rubber 220. Each of the forward-side injection nozzles A, B, and C is formed in a substantially spherical shape as shown in FIG. 26 so as to adjust an injecting direction of washer liquid "W" (see FIG. 20).

Each of the forward-side injection nozzles A, B, and C is oriented to a forward side of the blade rubber 220. More specifically, as shown in FIG. 20, the forward-side injection nozzle A on an outer peripheral side of the rear-side wall 262*c* is oriented to the forward side and the outer peripheral side of the blade rubber 220. In addition, the forward-side injection nozzle B at an intermediate portion of the rear-side wall 262*c* in the longitudinal direction is oriented to the forward side of the blade rubber 220 and a direction (horizontal direction) orthogonal to the longitudinal direction of the blade rubber 220. Furthermore, the forward-side injection nozzle C on an inner peripheral side of the rear-side wall 262*c* is oriented to the forward side and the inner peripheral side of the blade rubber 220.

In this manner, the forward-side injection nozzles A, B, and C are provided to the rear side wall 262*c*, and are oriented to three directions, that is, an outer peripheral side, just beside, and an inner peripheral side, respectively, on the forward side of the blade rubber 220. With this, the washer liquid "W" can be easily injected along the blade rubber 220 and in a direction (just beside) perpendicular to the blade rubber 220. Thus, a nearby portion on the forward side of the blade rubber 220 can substantially uniformly get wet. Here, if diffusion-type nozzles which inject the washer liquid "W" in a mist manner are used, it is possible to wet a wider area inside the wiping-out area "AR" (see FIG. 18).

Also, by the forward-side injection nozzles A, B, and C, a wide area inside the wiping-out area "AR" is wetted with the washer liquid "W", and the length dimension of the forward-side washer mechanism 261*a* along the longitudinal direction of the blade rubber 220 is shortened. Therefore, the channel through which the washer liquid "W" passes before injected can be shortened and, in turn, power consumption of the washer pump (not shown) can be reduced while the washer liquid "W" is inhibited from being frozen.

The rear-side wall 263*c* of the backward-side channel block 263 is provided with a plurality of backward-side injection nozzles D and E facing the front glass 120 as shown in FIG. 20. In the second embodiment, two backward-side injection nozzles D and E are provided. These backward-side injection nozzles D and E are disposed so as to be aligned along the longitudinal direction of the blade rubber 220 at a distance substantially equal to that of the forward-side injection nozzles A, B, and C.

Here, one backward-side injection nozzle D is disposed between the forward-side injection nozzles A and B along the longitudinal direction of the blade rubber 220, and the other backward-side nozzle E is disposed between the forward-side injection nozzles B and C along the longitudinal direction of the blade rubber 220. Also, each of the backward-side injection nozzles D and E is formed in a substantially spherical shape similar to that of each of the forward-side injection nozzles A, B and C so as to adjust an injecting direction of washer liquid "W" (see FIG. 20).

Each of the backward-side injection nozzles D and E is oriented to a backward side of the blade rubber 220. More specifically, as shown in FIG. 20, the backward-side injection nozzle D on an outer peripheral side of the rear-side wall 263*c* is oriented to the backward side and the outer peripheral side of the blade rubber 220. On the other hand, the backward-side injection nozzle E on an inner peripheral side of the rear-side wall 263*c* is oriented to the backward side and the inner peripheral side of the blade rubber 220.

In this manner, the backward-side injection nozzles D and E are provided to the rear-side wall 263*c*, and by orienting the backward-side injection nozzles D and E to two directions, that is, an outer peripheral side and an inner peripheral side, respectively, on the backward side of the blade rubber 220, it is possible to inject the washer liquid "W" along the longitudinal direction of the blade rubber 220 with ease. Therefore, a nearby portion on the backward side of the blade rubber 220 can substantially uniformly get wet. Here, if diffusion-type nozzles which inject the washer liquid "W" in a mist manner are also used as the backward-side injection nozzles D and E, it is possible to wet a wider area inside the wiping-out area "AR".

Also, as with the forward-side washer mechanism 261*a*, the length dimension of the backward-side washer mechanism 261*b* along the longitudinal direction of the blade rubber 220 is shortened. Therefore, also in the backward-side washer mechanism 261*b*, the channel through which the washer liquid "W" passes before injected can be shortened and, in turn, power consumption of the washer pump can be reduced while the washer liquid "W" is inhibited from being frozen.

Here, although not shown in detail, the injection positions of the washer liquid "W" injected from the forward-side injection nozzles A, B, and C and the injection positions of the backward-side injection nozzles D and E are alternately disposed along the longitudinal direction of the blade rubber 220. Therefore, in wiping-out motion of the blade rubber 220 for one reciprocation with injection of washer liquid, the front glass 212 can uniformly get wet. With this, in wiping-out motion of the blade rubber 220 for one reciprocation with injection of the washer liquid "W", a wide area on the front glass 212 can be cleanly washed.

FIG. 21 shows the wiper blade 210 when viewed along a plane perpendicular to the longitudinal direction of the blade rubber 220, and also shows the wiper blade 210 being in a vertical state without being tilted, with respect to the front surface of the front glass 212.

In the plane shown in FIG. 21, that is, in the plane perpendicular to the longitudinal direction of the blade rubber 220, a line segment passing through the contact unit 222a and parallel with the front surface of the front glass 212 is taken as a first reference line "L1". Also, in the plane shown in FIG. 21, a line segment passing through the contact unit 222a and in contact with the spacer member 235 forming the holder member 230 is taken as a second reference line "L2".

In the wiper blade 210 according to the third embodiment, the washer apparatus 260 is not disposed inside an area of a region "F1" formed between the first reference line "L1" and the second reference line "L2" (a portion with diagonal lines in the drawing). In this manner, in the third embodiment, the washer apparatus 260 is disposed outside the area of the region "F1" (outside the region) formed between the first reference line "L1" and the second reference line "L2".

Here, an angle α degrees formed by the first reference line "L1" and the second reference line "L2" is set at "substantially 30 degrees". With this, even if a center line CE of the blade rubber 220 is tilted in directions indicated by broken lines with arrows (1) and (4) in FIGS. 27A and 27B, respectively, with respect to a normal line n of the front glass 212, sufficient clearances CL1 and CL2 with a margin can be formed between the washer apparatus 260 and the front glass 212.

Here, by simply increasing the clearances CL1 and CL2 between the washer apparatus 260 and the front glass 212, a sliding contact (contact) between the washer apparatus 260 and the front glass 212 can be easily avoided. However, a distance from each of the injection nozzles A to E to the front glass 212, that is, the injection distance of the washer liquid "W" (see FIG. 20) is increased and, in turn, the injection position becomes disadvantageously unstable.

Thus, to satisfy these phenomena contrary to each other, it is desired that the position where the washer apparatus 260 is provided be a position away from the front glass 212 further than the boundary part BL between the spacer member 235 and the blade rubber 220 and brought closer as much as possible to an area of the region "F1" (portion with diagonal lines in FIG. 21) formed between the first reference line "L1" and the second reference line "L2" in the plane shown in FIG. 21, that is, in a plane perpendicular to the longitudinal direction of the blade rubber 220. That is, the positional relation with reference to the second reference line "L2" of FIG. 21 in the third embodiment is a substantially ideal positional relation to satisfy both of "avoidance of sliding contact" and "stabilization of the injection position" as described above.

However, with "stabilization of the injection position" being prioritized, as shown in FIG. 21, by taking a line segment passing through the contact unit 222a and having a tilted angle being β degrees (smaller than 20 degrees) with respect to the front surface of the front glass 212 as a third reference line "L3", and the washer apparatus 260 may be disposed outside the area of the region formed between the first reference line "L1" and the third reference line "L3". Here, this is based on that the center line CE of the blade rubber 220 is tilted by substantially 15 degrees at maximum with respect to the normal line n of the front glass 212 in the directions indicated by the broken lines with arrows (1) and (4) in FIG. 27A and FIG. 27B and a clearance narrower than the positional relation with reference to the above-described second reference line "L2" can be formed between the washer apparatus 260 and the front glass 212 under the state in which the wiper blade 210 is tilted at maximum (tilted on the order of 15 degrees). In this manner, by adopting a positional relation with reference to the third reference line "L3", "stabilization of the injection position" can be made favorable. Also, the risk of a slidable contact between the washer apparatus 260 and the front glass 212 is slightly increased.

Also, in each of the forward-side channel block 262 and the backward-side channel block 263 forming the washer apparatus 260, a tapered surface TP is formed. Even if the blade rubber 220 is degraded to narrow the clearances CL1 and CL2, a slidable contact between the washer apparatus 260 and the front glass 212 can be reliably avoided. Furthermore, by forming the tapered surface TP in each of the forward-side channel block 262 and the backward-side channel block 263, the thickness dimension of the washer apparatus 260 in a direction perpendicular to the longitudinal direction of the blade rubber 220 is gained. This increases the stiffness of the washer apparatus 260, thereby making the washer apparatus 260 applicable to a high-power washer pump.

Here, at the time of wiping-out motion to the forward side shown in FIG. 27A, the wiper blade 210 is first tilted in a direction indicated by a broken line with an arrow (1). Then, a pressing force from the wiper arm 211 is loaded in a direction indicated by a broken line with an arrow (2). With this, the blade rubber 220 is moved in a direction indicated by a broken line with an arrow (3), as being tilted at an optimum rubber contact angle (not shown). With this, attachments such as rain water and dust attached to the front glass 212 are cleanly wiped out.

Note that the wiping-out motion to the forward side is motion of the wiper blade 210 moving upward from a lower reverse position (not shown) in the wiping-out area "AR" (see FIG. 18) on the front glass 212 and then moving to an upper reverse position (not shown).

Also, at the time of wiping-out motion to the backward side shown in FIG. 27B, the wiper blade 210 is first tilted in a direction indicated by a broken line with an arrow (4). Then, a pressing force from the wiper arm 211 is loaded in a direction indicated by a broken line with an arrow (5). With this, the blade rubber 220 is moved in a direction indicated by a broken line with an arrow (6), as being tilted at an optimum rubber contact angle (not shown). With this, attachments such as rain water and dust attached to the front glass 212 are cleanly wiped out.

Here, the term "backward-side wiping-out motion" indicates that the wiper blade 210 is moved from the upper reverse position to the lower reverse position in the wiping-out area "AR" on the front glass 212.

To the inner-peripheral-side wall 262a of the forward-side channel block 262 and the inner-peripheral-side wall 263a of the backward-side channel block 263, a forward-side tube insertion unit 262i and a backward-side tube insertion unit 263i are integrally provided, respectively, as shown in FIGS. 19 and 20. To each of the forward-side tube insertion unit 262i and the backward-side tube insertion unit 263i, one end side of a rubber tube "TB" shown in FIG. 22 is inserted.

Here, to the other end side of the rubber tube "TB", the washer pump installed inside the engine room of the vehicle is connected. Also, the rubber tubes "TB" are arranged on the inner peripheral side along the longitudinal direction of the blade rubber 220, thereby making the other end side of the rubber tube "TB" easily introduced into the engine room.

Then, by operating a washer switch, the washer pump is driven. Then, as two-dot-chain lines with arrows in FIGS. 18 and 19, the washer liquid "W" is supplied via the rubber tubes "TB" to the inside of the forward-side channel block 262 and the backward-side channel block 263. Here, by switching driving of the washer pump, the washer liquid "W" is supplied only to the forward-side channel block 262 at the time of forward-side wiping-out motion of the wiper blade 210, and the washer liquid "W" is supplied only to the backward-side channel block 263 at the time of backward-side wiping-out motion of the wiper blade 210.

As described in detail above, according to the wiper blade 210 of the third embodiment, the washer apparatus 260 is fixed to the coupling member 240 which couples the holder member 230 and the wiper arm 211, and the washer apparatus 260 is provided at a position away from the front glass 212 compared with the boundary part BL between the holder member 230 and the blade rubber 220 on a plane perpendicular to the longitudinal direction of the blade rubber 220.

Therefore, the stiffness of the coupling member 240 is high (made of a steel sheet) because the wiper arm 211 is coupled. Thus, it is possible to prevent a rattle of the washer apparatus 260 and stabilize the injection position of the washer liquid "W".

Also, at the time of reciprocating wiping-out motion of the wiper blade 210, when the wiper blade 210 is tilted in the wiping-out direction, the washer apparatus 260 does not slidably contact with the front glass 212, thereby preventing a decrease in wiping-out performance.

The present invention is not restricted to the above-described third embodiment, and it goes without saying that the present invention can be variously modified in a range not deviating from the gist of the present invention. For example, while the wiper blade 210 wipes out the front glass 212 as a windshield in the above-described third embodiment, the present invention is not restricted to this, and the present invention can be applied as wiping out a rear glass as a windshield.

Also, in the third embodiment, three forward-side injection nozzles are provided, two backward-side injection nozzles are provided, and the washer liquid "W" as minimum as required is injected by these five injection nozzles in total, thereby reducing the consumption amount of the washer liquid "W". However, the present invention is not restricted to this construction. For example, the number of forward-side injection nozzles and the number of backward-side injection nozzles may be equal to each other, or the number of backward-side injection nozzles may be larger than the number of forward-side injection nozzles.

Furthermore, in the above-described second embodiment, the forward-side injection nozzles A, B, and C are provided on the rear-side wall 262c, and the backward-side injection nozzles D and E are provided on the rear-side wall 263c. However, the present invention is not restricted to this. For example, the forward-side injection nozzles A, B, and C may be provided on the forward-side wall 262e, and the backward-side injection nozzles D and E may be provided on the backward-side wall 263e.

The wiper blade is used to make visibility of the driver or others via the windshield favorable by wiping out the windshield provided to a vehicle such as automotive vehicle.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A wiper blade attached to a wiper arm provided to a vehicle to make reciprocating wiping-out motion over a windshield, the wiper blade comprising:
   a blade rubber in contact with the windshield;
   a holder member configured to hold the blade rubber;
   a coupling member provided at an intermediate portion of the holder member in a longitudinal direction, the coupling member coupling the wiper blade to the wiper arm; and
   a washer apparatus provided at an intermediate portion of the holder member in the longitudinal direction and fixed to the coupling member, the washer apparatus being configured to inject washer liquids onto the windshield, wherein
   the washer apparatus has a plurality of forward-side injection nozzles oriented to a forward side of the blade rubber and a plurality of backward-side injection nozzles oriented to a backward side of the blade rubber, the forward-side injection nozzles injecting first washer liquids at the time of forward-side wiping-out motion, the backward-side injection nozzles injecting second washer liquids at the time of backward-side wiping-out motion,
   injection positions toward which the first washer liquids are injected from the forward-side injection nozzles and injection positions toward which the second washer liquids are injected from the backward-side injection nozzles are shifted and alternately arranged in a longitudinal direction of the blade rubber, and
   as compared with the injection positions toward which the second washer liquids are injected from the backward-side injection nozzles, an outermost injection position and an innermost injection position of the injection positions toward which the first washer liquids are injected from the forward-side injection nozzles are respectively closer to an outer end and an inner end of the blade rubber in the longitudinal direction,
   wherein the holder member is elongated in the longitudinal direction and the majority of the longitudinal length of the holder member is uncovered by the coupling member.

2. The wiper blade according to claim 1, wherein among the forward-side injection nozzles and the backward-side injection nozzles, nozzles disposed on both sides in the longitudinal direction of the blade rubber are respectively oriented to one side and the other side in the longitudinal direction of the blade rubber.

3. The wiper blade according to claim 1, wherein the number of forward-side injection nozzles is larger than the number of backward-side injection nozzles.

4. The wiper blade according to claim 1, wherein
   a forward-side injection nozzle closest to one side in the longitudinal direction of the blade rubber among the forward-side injection nozzles is disposed closer to said one side in the longitudinal direction of the blade rubber as compared with a backward-side injection nozzle closest to said one side in the longitudinal direction of the blade rubber among the backward-side injection nozzles, and
   a forward-side injection nozzle closest to the other side in the longitudinal direction of the blade rubber among the forward-side injection nozzles is disposed closer to the other side in the longitudinal direction of the blade rubber than a backward-side injection nozzle closest to the other side in the longitudinal direction of the blade rubber among the backward-side injection nozzles.

* * * * *